US012698360B2

(12) United States Patent
Tuerk et al.

(10) Patent No.: US 12,698,360 B2
(45) Date of Patent: Aug. 4, 2026

(54) AMPHIPHILIC ALKOXYLATED POLYALKYLENE IMINES OR ALKOXYLATED POLYAMINES

(71) Applicant: BASF SE, Ludwigshafen (DE)

(72) Inventors: Holger Tuerk, Ludwigshafen (DE); Susanne Carina Engert, Ludwigshafen (DE); Eugen Risto, Ludwigshafen (DE); Alexander Michael Haydl, Mannheim (DE); Sophia Ebert, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 593 days.

(21) Appl. No.: 18/257,633

(22) PCT Filed: Dec. 21, 2021

(86) PCT No.: PCT/EP2021/087054

§ 371 (c)(1),
(2) Date: Jun. 15, 2023

(87) PCT Pub. No.: WO2022/136409

PCT Pub. Date: Jun. 30, 2022

(65) Prior Publication Data

US 2024/0132668 A1 Apr. 25, 2024

(30) Foreign Application Priority Data

Dec. 23, 2020 (EP) .................................... 20217099
May 31, 2021 (EP) .................................... 21176906

(51) Int. Cl.
*C08G 73/02* (2006.01)
*C11D 3/37* (2006.01)

(52) U.S. Cl.
CPC ....... *C08G 73/024* (2013.01); *C08G 73/0226* (2013.01); *C11D 3/3723* (2013.01)

(58) Field of Classification Search
None
See application file for complete search history.

(56) References Cited

U.S. PATENT DOCUMENTS 5,914,072 A 6/1999 Zirnstein et al.
2015/0122742 A1 5/2015 Hilfiger et al.
2020/0392286 A1 12/2020 Okkel et al.

FOREIGN PATENT DOCUMENTS

EP 0759440 A2 2/1997
GB 2562172 A 11/2018
WO 1995032272 A1 11/1995
WO 2009060059 A2 5/2009
WO 2015028191 A1 3/2015
WO 2020187648 A1 9/2020

OTHER PUBLICATIONS

European Search Report for EP Patent Application No. 21176906.2, Issued on Nov. 22, 2021, 3 pages.
International Search Report and Written Opinion for corresponding PCT/EP2021/087054, mailed Apr. 13, 2022, 11 pages.

*Primary Examiner* — Tae H Yoon
(74) *Attorney, Agent, or Firm* — Armstrong Teasdale LLP

(57) ABSTRACT

Disclosed herein are novel alkoxylated polyalkylene imines or alkoxylated polyamines having amphiphilic properties. Additionally disclosed herein is a process for preparing such alkoxylated polyalkylene imines or alkoxylated polyamines as well as a method of using such compounds within, for example, cleaning compositions and/or in fabric and home care products. Further disclosed herein are those compositions or products as such.

16 Claims, No Drawings

AMPHIPHILIC ALKOXYLATED POLYALKYLENE IMINES OR ALKOXYLATED POLYAMINES

CROSS-REFERENCE TO RELATED APPLICATIONS

This application is a U.S. National Phase Application of International Patent Application No. PCT/EP2021/087054, filed Dec. 21, 2021, which claims priority to European Patent Application No. 21176906.2, filed May 31, 2021, which claims priority to European Patent Application No. 20217099.9, filed Dec. 23, 2020, each of which is hereby incorporated by reference herein.

DESCRIPTION

The present invention relates to novel alkoxylated polyalkylene imines or alkoxylated polyamines obtainable by a process comprising the steps a) to d) and having amphiphilic properties. According to step a), a polyalkylene imine or a polyamine as such is reacted with a first alkylene oxide (AO1) in order to obtain a first intermediate (I1). Said first intermediate (I1) is reacted with a lactone and/or a hydroxy carbon acid in step b) in order to obtain a second intermediate (I2) followed by step c), wherein said second intermediate (I2) is reacted with ethylene oxide in order to obtain a third intermediate (I3). Afterwards, said second intermediate (I3) is reacted in step d) with a second alkylene oxide (AO2) in order to obtain the novel alkoxylated polyalkylene imines or alkoxylated polyamines according to the present invention. The present invention further relates to a process as such for preparing such alkoxylated polyalkylene imines or alkoxylated polyamines as well as to the use of such compounds within, for example, cleaning compositions and/or in fabric and home care products. Furthermore, the present invention also relates to those compositions or products as such.

Due to the climate change, one of the most important targets of the D&C industry today is to lower significantly the CO2 emission per wash, by improving cold water conditions. Another important target of the D&C industry is the need for biodegradable polymers, to improve the sustainability of the laundry formulations and to avoid the accumulation of non-degradable polymers in the ecosystem. Although the technical hurdle is quite big to improve cold water cleaning performance, especially for the class of oily and fatty stains, amphiphilic alkoxylated polyamines, especially the ones based on polyalkylene imines like polyethylene imines (PEI), are already known in the literature to be able to contribute to oily/fatty soil removal at such conditions. However, those structures are not biodegradable.

WO 2015/028191 relates to water-soluble alkoxylated polyalkylene imines having an inner block of polyethylene oxide comprising 5 to 18 polyethylene oxide units, a middle block of polyalkylene oxide comprising 1 to 5 polyalkylene oxide units and an outer block of polyethylene oxide comprising 2 to 14 polyethylene oxide units. The middle block is formed from polypropylene oxide units, polybutylene oxide units and/or polypentene oxide units. In addition, WO 2015/028191 relates to water-soluble alkoxylated polyamines.

WO 2020/187648 also relates to polyalkoxylated polyalkylene imines or alkoxylated polyamines according to a general formula (I). The compounds described therein may be employed within, for example, cosmetic formulations. However, the specific compounds disclosed within WO 2020/187648 differ from the respective compounds of the present invention. Since the substituents of WO 2020/187648 do not comprise any fragments based on lactones and/or hydroxy carbon acids.

GB-A 2 562 172 relates to specific functionalized polyalkylene imine polymers according to general formula (I), which compositions are employed as pigment dispersions. GB-A 2 562 172 does not disclose any alkoxylated polyalkylene imine or alkoxylated polyamines containing any substituents having fragments based on alkylene oxide, followed by a lactone and/or hydroxy carbon acid based fragment, followed by an ethylene oxide based fragment and followed again by another alkylene oxide based fragment.

WO 95/32272 describes ethoxylated and/or propoxylated polyalkylene amine polymers to boost soil dispersing performance, wherein said polymers have an average ethoxylation/propoxylation of from 0.5 to 10 per nitrogen.

EP-A 0 759 440 discloses a dispersing agent for solids based on the phosphonation at the end groups of compounds such as a polyurethane. A polyurethane as such is obtained by the reaction of an amine with an alkylene oxide or an alkylene carbonate, wherein 50 to 100% of the NH-functionalities of the respective amine are oxylated. Afterwards, the respective intermediate (aminoalcohol) is again reacted with a hydroxy carboxylic acid or a diacid and a diol in order to obtain a polyester, or a respective reaction with a diisocyanate is carried out in order to obtain such a polyurethane. The various individual intermediates of the second reaction step are phosphonated within a last reaction step afterwards. By consequence, EP-A 0 759 440 does not disclose any alkoxylated polyalkylated imines or alkoxylated polyamines according to the present invention obtainable by a process comprising the steps a) to d) as defined below.

The object of the present invention is to provide novel compounds based on a polyalkylene imine backbone or a polyamine backbone. Furthermore, those novel compounds should have beneficial properties when being employed within compositions in respect of their biodegradability.

US-A 2020/392286 relates to an acid functional compound comprising at least one segment consisting of at least one ether unit E and at least one ester unit, wherein the ether units and ester units are connected by an ether link or by an ester link, and wherein the ether units and ester units are arranged in a random order, and at least one acidic group, wherein the at least one acidic group is covalently linked to the at least one segment. US-A 2020/392286 does not disclose any alkoxylated polyalkylated imines or alkoxylated polyamines according to the present invention, obtainable by a process comprising the steps a) to d) as defined below.

US-A 2015/122742 is related to demulsifiers to break emulsions, particularly oilfield emulsions, based on lactone/alkylene oxide polymers. These polymers are made from addition reactions of a hydroxyl- and/or amine-containing base compound with at least one lactone monomer and at least one alkylene oxide monomer. US-A 2015/122742 does not disclose any alkoxylated polyalkylated imines or alkoxylated polyamines according to the present invention, obtainable by a process comprising the steps a) to d) as defined below.

The object is achieved by an alkoxylated polyalkylene imine or alkoxylated polyamine obtainable by a process comprising the steps a) to d) as follows:

a) reaction of i) at least one polyalkylene imine or at least one polyamine with ii) at least one first alkylene oxide (AO1), wherein 0.25 to 7.0 mol of alkylene oxide (AO1) is employed per mol of NH-functionality of polyalkylene imine or of polyamine, in order to obtain a first intermediate (I1), b) reaction of the first intermediate (I1) with at least one lactone and/or at least one hydroxy carbon acid, wherein 0.25 to 10 mol of lactone and/or of hydroxy carbon acid is employed per mol of NH-functionality of polyalkylene imine or of polyamine (as employed in step a)), in order to obtain a second intermediate (I2), c) reaction of the second intermediate (I2) with ethylene oxide, wherein 1 to 100 mol of ethylene oxide is employed per mol of NH-functionality of polyalkylene imine or of polyamine (as employed in step a)), in order to obtain a third intermediate (I3), d) reaction of the third intermediate (I3) with at least one second alkylene oxide (AO2), wherein at least 1 mol of alkylene oxide (AO2) is employed per mol of NH—functionality of polyalkylene imine or of polyamine (as employed in step a)), in order to obtain the alkoxylated polyalkylene imine or the alkoxylated polyamine, and wherein the second alkylene oxide (AO2) is different to ethylene oxide in case only one second alkylene oxide (AO2) is employed in step d).

The alkoxylated compounds according to the present invention may be used in cleaning compositions. They lead to at least comparable and preferably even improved cleaning performance of said composition, for example in respect of removing fat and/or oil, compared to corresponding alkoxylated compounds according to the prior art. Beyond that, the alkoxylated compounds according to the present invention lead to an improved biodegradability when being employed within compositions, for example, within cleaning compositions.

An advantage of the alkoxylated compounds according to the present invention can be seen in their amphiphilic properties, especially due to the employment of higher alkylene oxides than ethylene oxide within step d) of the inventive process. The compounds of the present invention combine good biodegradability properties with amphiphilic properties.

Another advantage can be seen within the respective detergent formulations containing the inventive compounds, for example, in liquid and solid (powder) formulations containing at least one surfactant and the inventive compound, preferably with focus on laundry formulations and manual dish wash formulations with main focus on liquid laundry and liquid manual dish wash formulations, and with very specifically focus on liquid laundry formulations and single mono doses for laundry, containing at least one anionic surfactant, water and the inventive compound.

For the purposes of the present invention, definitions such as $C_1$-$C_{22}$-alkyl, as defined below for, for example, the radical $R^2$ in formula (IIa), mean that this substituent (radical) is an alkyl radical having from 1 to 22 carbon atoms. The alkyl radical can be either linear or branched or optionally cyclic. Alkyl radicals which have both a cyclic component and a linear component likewise come within this definition. The same applies to other alkyl radicals such as a $C_1$-$C_4$-alkyl radical. Examples of alkyl radicals are methyl, ethyl, n-propyl, sec-propyl, n-butyl, sec-butyl, isobutyl, 2-ethylhexyl, tert-butyl (tert-Bu/t-Bu), pentyl, hexyl, heptyl, cyclohexyl, octyl, nonyl, decyl or dodecyl.

The term "$C_2$-$C_{22}$-alkylene" as used herein refers to a saturated, divalent straight chain or branched hydrocarbon chains of 2, 3, 4, 5, 6, 10, 12 or up to 22 carbon atoms, examples including ethane-1,2-diyl ("ethylene"), propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl ("1,2-butylene"), butane-2,3-diyl, 2-methyl-butan-1,3-diyl, 3-methyl-butan-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl.

The term "$C_5$-$C_{10}$-cycloalkylene" as used herein refers to saturated, divalent hydrocarbons of 5, 6, 7, 8, 9 or 10 carbon atoms wherein all or at least a part of the respective number of carbon atoms form a cycle (ring). In case not all of the respective number of carbon atoms form a cycle, such remaining carbon atoms (i. e. those carbon atoms not forming a cycle) form a methane-1,1-diyl ("methylene") fragment or an ethane-1,2-diyl ("ethylene") fragment of the respective $C_5$-$C_{10}$-cycloalkylene radicals. One of the two valencies of said respective methylene or ethylene fragments is bound to a neighbouring nitrogen atom within general formula (I), whereas the second valency of said fragments is bound to the cyclic fragment of said $C_5$-$C_{10}$-cycloalkylene radical.

Expressed in other words, a $C_5$-$C_{10}$-cycloalkylene radical may comprise, in addition to its cyclic fragment, also some non-cyclic fragments building a bridge or a linker of the cyclic fragment of the $C_5$-$C_{10}$-cycloalkylene radical to the neighbouring nitrogen atom within general formula (I). The number of such carbon linker atoms is usually not more than 3, preferably 1 or 2. For example, a $C_7$-cycloalkylene radical may contain one $C_6$-cycle and one $C_1$-linker.

The respective hydrocarbon cycle itself may be unsubstituted or at least monosubstituted by $C_1$-$C_3$-alkyl. It has to be noted that the carbon atoms of the respective $C_1$-$C_3$-alkyl substituents are not considered for determination of the number of carbon atoms of the $C_5$-$C_{10}$-cycloalkylene radical. In contrast to that, the number of carbon atoms of such a $C_5$-$C_{10}$-cycloalkylene radical is solely determined without any substituents, but only by the number of carbon atoms of the cyclic fragment and optionally present carbon linker atoms (methylene or ethylene fragments).

Examples for $C_5$-$C_{10}$-cycloalkylene include cyclopentane-1,2-diyl, cyclohexane-1,2-diyl, cyclohexane-1,3-diyl, cyclohexane-1,4-diyl, 3-(methane-1,1-diyl)-cyclohexane-1,3-diyl, cycloheptane-1,3-diyl or cyclooctane-1,4-diyl, each of the aforementioned radicals may be at least monosubstituted with $C_1$-$C_3$-alkyl.

It is preferred that the respective $C_5$-$C_{10}$-cycloalkylene radical is employed as a mixture of two or more individual cycloalkylene radicals having the same ring size. It is particularly preferred to employ a mixture of cyclohexane-1,3-diyl monosubstituted with methyl in position 2 or 4, respectively, of the cycle. The ratio of the two compounds is preferably in a range of 95:5 to 75:25, most preferably about 85:15 (4-methyl versus 2-methyl). 3-(methane-1,1-diyl)-cyclohexane-1,3-diyl is a preferred example for a $C_5$-$C_{10}$-cyclo-alkylene radical having a non-cyclic fragment in addition to its cyclic fragment. For this specific case, the non-cyclic fragment is a $C_1$-linker and the cyclic fragment is a $C_6$-cycle resulting in a $C_7$-cycloalkylene radical. 3-(methane-1,1-diyl)-cyclohexane-1,3-diyl may also be substituted with at least one $C_1$-$C_3$-alkyl, preferably with three methyl groups, in particular 3,5,5-trimethyl. The latter one is a fragment of isophorone diamine, which may be employed as backbone with general formula (I).

For the purposes of the present invention, the term "aralkyl", as defined below for, for example, the radical $R^2$ in formula (IIa), means that the substituent (radical) is an aromatic ("ar") combined with an alkyl substituent ("alkyl"). The aromatic "ar" part can be a monocyclic, bicyclic or optionally polycyclic aromatic. In the case of polycyclic aromatics, individual rings can optionally be fully or partially saturated. Preferred examples of aryl are phenyl, naphthyl or anthracyl, in particular phenyl.

Within the context of the present invention, the term "polyalkylene imine" differs from the corresponding term "polyamine" especially in respect of the branching of the compounds as such as employed within step a) as educt or within the backbone of the corresponding alkoxylated compounds as such as obtained within step d) of the inventive process. Whereas polyamines in the context of the present invention are (predominantly) linear compounds (in respect of its backbone without consideration of any alkoxylation), containing primary and/or secondary amino moieties but no tertiary amino moieties within its backbone, the corresponding polyalkylene imines are, according to the present invention, (predominantly) branched molecules containing (in respect of its backbone without consideration of any alkoxylation), in addition to the primary and/or secondary amino moieties, mandatorily tertiary amino moieties, which cause the branching of the (linear) main chain into several side chains within the polymeric backbone (basic skeleton). Polyalkylene imines, both as backbone and as alkoxylated compounds, are those compounds falling under the definition of general formula (I), wherein z is an integer of at least 1. In contrast to that, polyamines, both as backbone and as alkoxylated compounds, are those compounds of formula (I), wherein z is 0.

By consequence, the inventive alkoxylated polyalkylene imines have a basic skeleton (backbone), which comprises primary, secondary and tertiary amine nitrogen atoms which are joined by alkylene radicals R (as defined below) and are in the form of the following moieties in random arrangement:

primary amino moieties which terminate the main chain and the side chains of the basic skeleton and whose hydrogen atoms are subsequently replaced by alkylenoxy units:

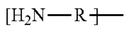 and 

secondary amino moieties whose hydrogen atom is subsequently replaced by alkylenoxy units:

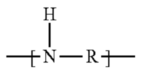

tertiary amino moieties which branch the main chain and the side chains:

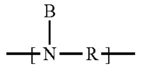

For the sake of completeness, it is indicated that the variable B indicating the branching of the polyalkylene imine backbone of compounds according to general formula (I) may contain fragments, such as —[—NH—R]$_y$—, $H_2N$—R or combinations thereof, including a two times, three times or even higher degree of branching. Said tertiary amino moieties are not present in the backbone of polyamine compounds. The degree of branching may be determined, for example, by NMR-spectroscopy such as $^1$H-NMR or preferably $^{13}$C-NMR.

In order to obtain the respective alkoxylated compounds, the hydrogen atoms of the primary and/or secondary amino groups of the basic polyalkylene imine or polyamine skeleton are replaced by substituents such as those according to the formula (IIa) or (IIb) as defined below.

Within the context of the present invention, the term "polyalkylene imine backbone" relates to those fragments of the inventive alkoxylated polyalkylene imines which are not alkoxylated. The polyalkylene imine backbone is employed within the present invention as an educt in step a) to be reacted first with at least one first alkylene oxide (AO1), followed by reaction (in step b)) with at least one lactone or hydroxy carbon acid, followed by ethoxylation within step c) and then alkoxylated again in step d) with at least one second alkylene oxide (AO2) in order to obtain the inventive alkoxylated polyalkylene imines ("alkoxylated compounds"). In step d) at least one second alkylene oxide (AO2) must be different to ethylene oxide as employed in step c). Polyalkylene imines as such (backbones or not alkoxylated compounds) are known to a person skilled in the art. Examples of such types of compounds are polyethylene imines (PEI), such as PEI 600, PEI 800 or PEI 2000, which are also commercially available.

Within the context of the present invention, the term "polyamine backbone" relates to those fragments of the inventive alkoxylated polyamines which are not alkoxylated. The polyamine backbone is employed within the present invention as an educt in step a) to be reacted first with at least one first alkylene oxide (AO1), followed by reaction (in step b)) with at least one lactone or hydroxy carbon acid, followed by ethoxylation within step c) and then alkoxylated again in step d) with at least one second alkylene oxide (AO2) in order to obtain the inventive alkoxylated polyamines ("alkoxylated compounds"). In step d) at least one second alkylene oxide (AO2) must be different to ethylene oxide as employed in step c). Polyamines as such (backbones or not alkoxylated compounds) are known to a person skilled in the art.

Within the context of the present invention, the term "NH-functionality" is defined as follows: In case of (predominantly) linear amines, such as di- and oligo amines like N4 amine or hexamethylene diamine, the structure itself gives information about the content of primary, secondary and tertiary amines. A primary amino group (—NH2) has two NH— functionalities, a secondary amino group only one NH functionality, and a tertiary amino group, by consequence, has no reactive NH functionality. In case of (predominantly) branched polyethylene imines, such as those as obtained from polymerization of the monomer ethylene imine (C2H5N), the respective polymer (polyethylene imine) contains a mixture of primary, secondary and tertiary amino groups. The exact distribution of primary, secondary and tertiary amino groups can be determined as described in Lukovkin G. M., Pshezhetsky V. S., Murtazaeva G. A.: *Europ. Polymer Journal* 1973, 9, 559-565 and St. Pierre T., Geckle M.: *ACS Polym. Prep.* 1981, 22, 128-129. In case of the modification with lactone or hydroxyacids and alkylene oxides it is assumed, that polyethylene imine consist of a 1:1:1 mixture of primary, secondary and tertiary amino groups, and therefore, an amount resembling the molar mass of the monomer employed, such as ethylene imine, contributes in average with one (reactive) NH-functionality. This is the molecular weight of the repeating unit.

The invention is specified in more detail as follows:

The invention relates to an alkoxylated polyalkylene imine or alkoxylated polyamine obtainable by a process comprising the steps a) to d) as follows:

a) reaction of i) at least one polyalkylene imine or at least one polyamine with ii) at least one first alkylene oxide (AO1), wherein 0.25 to 7.0 mol, preferably 0.25 to 5.0 mol, of alkylene oxide (AO1) is employed per mol of NH-functionality of polyalkylene imine or of polyamine, in order to obtain a first intermediate (I1), b) reaction of the first intermediate (I1) with at least one lactone and/or at least one hydroxy carbon acid, wherein 0.25 to 10 mol of lactone and/or of hydroxy carbon acid is employed per mol of NH-functionality of polyalkylene imine or of polyamine (as employed in step a)), in order to obtain a second intermediate (I2), c) reaction of the second intermediate (I2) with ethylene oxide, wherein 1 to 100 mol of ethylene oxide is employed per mol of NH-functionality of polyalkylene imine or of polyamine (as employed in step a)), in order to obtain a third intermediate (I3), d) reaction of the third intermediate (I3) with at least one second alkylene oxide (AO2), wherein at least 1 mol of alkylene oxide (AO2) is employed per mol of NH—functionality of polyalkylene imine or of polyamine (as employed in step a)), in order to obtain the alkoxylated polyalkylene imine or the alkoxylated polyamine, and wherein the second alkylene oxide (AO2) is different to ethylene oxide in case only one second alkylene oxide (AO2) is employed in step d).

The polyalkylene imine or the polyamine employed in step a) may be any of those compounds known to a person skilled in the art. It is preferred that the polyalkylene imine or polyamine as employed in step a) is defined according to general formula (I)

(I)

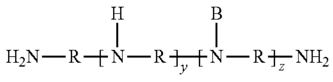

in which the variables are each defined as follows:

R represents identical or different, i) linear or branched $C_2$-$C_{12}$-alkylene radicals or ii) an etheralkyl unit of the following formula (III):

(III)

$$—R^{10}—(O—R^{11})_d—O—R^{12}—$$

in which the variables are each defined as follows:

$R^{10}$, $R^{11}$, $R^{12}$ represent identical or different, linear or branched $C_2$-$C_6$-alkylene radicals and d is an integer having a value in the range of 0 to 50 or iii) $C_5$-$C_1$a cycloalkylene radicals optionally substituted with at least one $C_1$-$C_3$ alkyl;

B represents a continuation of the polyalkylene imine by branching;

y and z are each an integer having a value in the range of 0 to 150;

preferably, R represents identical or different, i) linear or branched $C_2$-$C_{12}$-alkylene radicals, more preferably R is ethylene, propylene or hexamethylene, or ii) $C_5$-$C_{10}$-cycloalkylene radicals optionally substituted with at least one $C_1$-$C_3$-alkyl, more preferably R is at least one $C_6$-$C_7$-cycloalkylene radical substituted with at least one methyl or ethyl.

For the sake of completeness, it is indicated that the variable B indicating the branching of the polyalkylene imine compounds according to general formula (I) may contain fragments, such as —[—NH—R]$_y$—, $H_2N$—R or combinations thereof, including a two times, three times or even higher degree of branching. Said tertiary amino moieties caused by the branching of the backbone are not present within polyamine compounds according to general formula (I) since the variable z is 0 for those kind of compounds within formula (I).

In a preferred embodiment of the present invention, the alkoxylated polyalkylene imine or alkoxylated polyamine contains at least one residue according to general formula (IIa)

(IIa)

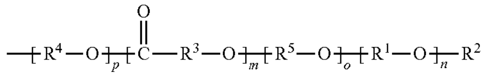

in which the variables are each defined as follows:

$R^1$ represents $C_2$-$C_{22}$-(1,2-alkylene) radicals;

$R^2$ represents hydrogen and/or $C_1$-$C_{22}$-alkyl and/or $C_7$-$C_{22}$-aralkyl;

$R^3$ represents linear or branched $C_1$-$C_{22}$-alkylene radicals;

$R^4$ represents $C_2$-$C_{22}$-(1,2-alkylene) radicals;

$R^5$ represents 1,2-ethylene;

m is an integer having a value of at least 1 to 10;

n is an integer having a value of at least 5 to 100;

o is an integer having a value of at least 1 to 100;

p is an integer having a value of at least 1 to 5;

preferably the variables within general formula (IIa) are defined as follows:

$R^1$ represents 1,2-ethylene, 1,2-propylene and/or 1,2-butylene, most preferably 1,2-propylene; and/or $R^2$ represents hydrogen and/or $C_1$-$C_4$-alkyl, preferably hydrogen, methyl and/or ethyl, most preferably hydrogen; and/or $R^3$ represents linear or branched $C_2$-$C_{10}$-alkylene radicals, preferably linear or branched $C_2$-$C_5$-alkylene radicals; and/or $R^4$ represents 1,2-ethylene and/or 1,2-propylene, preferably 1,2-propylene; and/or $R^5$ represents 1,2-ethylene; and/or m is an integer having a value in the range of 1 to 5, preferably of 1 to 3; and/or n is an integer having a value in the range of 10 to 50, preferably of 15 to 30; and/or is an integer having a value in the range of 10 to 50, preferably of 20 to 35; and/or p is 1 or 2.

In another preferred embodiment, the alkoxylated polyalkylene imine or alkoxylated polyamine contains at least one residue according to general formula (IIa)

(IIa)

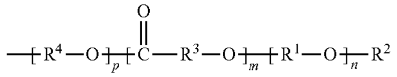

in which the variables are each defined as follows:

$R^1$ represents $C_2$-$C_{22}$-(1,2-alkylene) radicals;

$R^2$ represents hydrogen and/or $C_1$-$C_{22}$-alkyl and/or $C_7$-$C_{22}$-aralkyl;

$R^3$ represents linear or branched $C_1$-$C_{22}$-alkylene radicals;

$R^4$ represents $C_2$-$C_{22}$-(1,2-alkylene) radicals;

m is an integer having a value of at least 1 to 10;

n is an integer having a value of at least 5 to 100;

p is an integer having a value of at least 1 to 5;

preferably the variables within general formula (IIa) are defined as follows:

$R^1$ represents 1,2-ethylene, 1,2-propylene and/or 1,2-butylene, most preferably 1,2-ethylene; and/or $R^2$ represents hydrogen and/or $C_1$-$C_4$-alkyl, preferably hydrogen, methyl and/or ethyl, most preferably hydrogen; and/or $R^3$ represents linear or branched $C_2$-$C_{10}$-alkylene radicals, preferably linear or branched $C_2$-$C_5$-alkylene radicals; and/or $R^4$ represents 1,2-ethylene, 1,2-propylene, 1,2-butylene and/or 1,2-pentylene, more preferably 1,2-propylene and/or 1,2-butylene; and/or m is an integer having a value in the range of 1 to 5, preferably of 1 to 3; and/or n is an integer having a value in the range of 8 to 40, preferably of 10 to 25; and/or p is 1 or 2.

In addition to the presence of at least one residue according to general formula (IIa) as described above, it is preferred that the alkoxylated polyalkylene imine or alkoxylated polyamine contains at least one residue according to general formula (IIb)

(IIb)

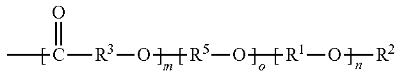

in which the variables are each defined as follows:

$R^1$ represents $C_2$-$C_{22}$-(1,2-alkylene) radicals;

$R^2$ represents hydrogen and/or $C_1$-$C_{22}$-alkyl and/or $C_7$-$C_{22}$-aralkyl;

$R^3$ represents linear or branched $C_1$-$C_{22}$-alkylene radicals;

$R^5$ represents 1,2-ethylene;

m is an integer having a value of at least 1 to 10;

n is an integer having a value of at least 5 to 100;

o is an integer having a value of at least 1 to 100;

preferably the variables within general formula (IIb) are defined as follows:

$R^1$ represents 1,2-ethylene, 1,2-propylene and/or 1,2-butylene, most preferably 1,2-propylene; and/or $R^2$ represents hydrogen and/or $C_1$-$C_4$-alkyl, preferably hydrogen, methyl and/or ethyl, most preferably hydrogen; and/or $R^3$ represents linear or branched $C_2$-$C_{10}$-alkylene radicals, preferably linear or branched $C_2$-$C_5$-alkylene radicals; and/or $R^5$ represents 1,2-ethylene; and/or m is an integer having a value in the range of 1 to 5, preferably of 1 to 3; and/or n is an integer having a value in the range of 10 to 50, preferably of 15 to 30; and/or is an integer having a value in the range of 10 to 50, preferably of 20 to 35.

In another embodiment of the present invention, it is preferred that the alkoxylated polyalkylene imine or alkoxylated polyamine contains at least one residue according to general formula (IIc)

$$-[R^5-O]_o-[R^1-O]_n-R^2 \quad \text{(IIc)}$$

in which the variables are defined as follows:

$R^1$ represents $C_2$-$C_{22}$-(1,2-alkylene) radicals;

$R^2$ represents hydrogen and/or $C_1$-$C_{22}$-alkyl;

$R^5$ represents 1,2-ethylene;

n is an integer having a value of at least 5 to 100;

o is an integer having a value of at least 0 to 100;

preferably the variables within general formula (IIc) are defined as follows:

$R^1$ represents 1,2-ethylene, 1,2-propylene and/or 1,2-butylene, most preferably 1,2-propylene; and/or $R^2$ represents hydrogen and/or $C_1$-$C_4$-alkyl, preferably hydrogen, methyl and/or ethyl, most preferably hydrogen; and/or $R^5$ represents 1,2-ethylene; and/or n is an integer having a value in the range of 10 to 50, preferably of 15 to 30; and/or o is an integer having a value in the range of 10 to 50, preferably of 20 to 35.

Another preferred embodiment relates to an alkoxylated imine or alkoxylated polyamine, wherein the residue (IIa) accounts for at least 80 wt.-%, more preferably at least 90 wt.-%, and even more preferably at last 95 wt.-% of all residues (IIa), (IIb) and (IIIc) attached to the amino groups of the polyalkylene imine or polyamine as employed in step a).

In another embodiment of the present invention, it is preferred that i) step a) is carried out in the presence of water and/or in the presence of a base catalyst, and/or ii) the weight-average molecular weight (Mw) of the polyalkylene imine or of the polyamine employed in step a) lies in the range of 50 to 10 000 g/mol, preferably in the range of 500 to 5000 g/mol, more preferably in the range of 600 to 2 500 g/mol, and/or iv) at least two different alkylene oxides are employed as second alkylene oxide (AO2) in step d) in consecutive order, preferably ethylene oxide followed by propylene oxide are employed as second alkylene oxide (AO2) in step d) in consecutive order; and/or v) in step d) the second alkylene oxide (AO2) comprises >80% by weight, preferably >90% by weight, of propylene oxide and/or 1,2-butylene oxide; and/or vi) residues according to general formula (IIc) do not account for >50% of all residues on the alkoxylated polyalkylene imine or alkoxylated polyamine.

The person skilled in the art knows how to determine/measure the respective weight average molecular weight ($M_w$). This can be done, for example, by size exclusion chromatography (such as GPC). Preferably, $M_w$ values are determined by the method as follows: OECD TG 118 (1996), which means in detail OECD (1996), Test No. 118*: Determination of the Number-Average Molecular Weight and the Molecular Weight Distribution of Polymers using Gel Permeation Chromatography*, OECD Guidelines for the Testing of Chemicals, Section 1, OECD Publishing, Paris, also available on the internet, for example, under https://doi.org/10.1787/9789264069848-en.

Another embodiment of the present invention only relates to alkoxylated polyalkylene imines (as such) as described above, it is preferred that the variables are each defined as follows:

R is ethylene and/or propylene, preferably ethylene;

the sum of y+z is an integer having a value in the range of 9 to 120, preferably in the range of 10 to 20.

Another embodiment of the present invention only relates to alkoxylated polyamines (as such) as described above, it is preferred that y is an integer having a value in the range of 0 to 10;

z is 0;

R represents identical or different, linear or branched $C_2$-$C_{12}$-alkylene radicals or an etheralkyl unit according to formula (III), wherein d is from 1 to 5, and $R^{10}$, $R^{11}$, $R^{12}$ are independently selected from linear or branched $C_3$ to $C_4$ alkylene radicals.

In another embodiment of the present invention, it is preferred that up to 100% of the nitrogen atoms present in the alkoxylated polyalkylene imine or alkoxylated polyamine are quaternized, preferably the degree of quaternization of the nitrogen atoms present in the alkoxylated polyalkylene imine or alkoxylated polyamine lies in the range of 10% to 95%.

In another embodiment of the present invention, it is preferred that i) in step b) the lactone is caprolactone, and/or ii) in step b) the hydroxy carbon acid is lactic acid or glycolic acid, and/or iii) in step a) the first alkylene oxide (AO1) is at least one $C_2$-$C_{22}$-epoxide, preferably ethylene oxide and/or propylene oxide, more preferably propylene oxide, and/or iv) in step d) the second alkylene oxide (AO2) comprises propylene oxide, preferably ethylene oxide followed by propylene oxide are employed as second alkylene oxide (AO2) in consecutive order, and/or v) in step d) the second alkylene oxide (AO2) comprises >80% by weight, preferably >90% by weight, of propylene oxide and/or 1,2-butylene oxide.

In another embodiment of the present invention, it is preferred that i) in step a) 0.5 to 2 mol, preferably 0.75 to 1.5 mol, of alkylene oxide (AO1) is employed per mol of NH-functionality of polyalkylene imine or of polyamine, and/or ii) in step b) 0.5 to 3 mol, preferably 1 to 2 mol, of lactone and/or of hydroxy carbon acid is employed per mol of NH-functionality of polyalkylene imine or of polyamine (as employed in step a)), and/or iii) in step c) 10 to 50 mol, preferably 20 to 35 mol, of ethylene oxide is employed per mol of NH-functionality of polyalkylene imine or of polyamine (as employed in step a)), and/or iv) in step d) 10 to 50 mol, preferably 15 to 30 mol, of alkylene oxide (AO2) is employed per mol of NH-functionality of polyalkylene imine or of polyamine (as employed in step a)), and/or v) the alkyoxylated polyalkylene imine or alkoxylated polyamine is amphiphilic.

The inventive alkoxylated polyalkylene imines or alkoxylated polyamines may also be quaternized. A suitable degree of quaternization is up to 100%, in particular from 10 to 95%. The quaternization is effected preferably by introducing $C_1$-$C_{22}$-alkyl groups, $C_1$-$C_4$-alkyl groups and/or $C_7$-$C_{22}$-aralkyl groups and may be undertaken in a customary manner by reaction with corresponding alkyl halides and dialkyl sulfates.

The quaternization may be advantageous in order to adjust the alkoxylated polyalkylene imines or the alkoxylated polyamines to the particular composition such as cosmetic compositions in which they are to be used, and to achieve better compatibility and/or phase stability of the formulation.

The quaternization of alkoxylated polyalkylene imines or alkoxylated polyamines is achieved preferably by introducing $C_1$-$C_{22}$ alkyl, $C_1$-$C_4$-alkyl groups and/or $C_7$-$C_{22}$ aralkyl, aryl or alkylaryl groups and may be undertaken in a customary manner by reaction with corresponding alkyl-, aralkyl-halides and dialkylsulfates, as described for example in WO 09/060059.

Quaternization can be accomplished, for example, by reacting an alkoxylated polyamine or alkoxylated polyalkylene imine with an alkylation agent such as a $C_1$-$C_4$-alkyl halide, for example with methyl bromide, methyl chloride, ethyl chloride, methyl iodide, n-butyl bromide, isopropyl bromide, or with an aralkyl halide, for example with benzyl chloride, benzyl bromide or with a di-$C_1$-$C_{22}$-alkyl sulfate in the presence of a base, especially with dimethyl sulfate or with diethyl sulfate. Suitable bases are, for example, sodium hydroxide and potassium hydroxide.

The amount of alkylating agent determines the amount of quaternization of the amino groups in the polymer, i.e. the amount of quaternized moieties.

The amount of the quaternized moieties can be calculated from the difference of the amine number in the non-quaternized amine and the quaternized amine.

The amine number can be determined according to the method described in DIN 16945.

The quaternization can be carried out without any solvent. However, a solvent or diluent like water, acetonitrile, dimethylsulfoxide, N-methylpyrrolidone, etc. may be used. The reaction temperature is usually in the range from 10° C. to 150° C. and is preferably from 50° C. to 100° C.

Another subject of the present invention is a process for preparing the alkoxylated polyalkylene imines or the alkoxylated polyamines as described above. In the following the steps a) to d) (as described above) are described in more detail. The below information also applies to the above described polymer as such obtainable by the respective process. Within this process, a polyalkylene imine (as such) or a polyamine (as such) is according to step a) first reacted with a first alkylene oxide (AO1), followed in step b) by reaction of the respective intermediate (I1) with at least one lactone and/or at least one hydroxy carbon acid followed by ethoxylation in step c) and then (in step d)) followed by reaction with at least one second alkylene oxide (AO2), with at least one alkylene oxide different to ethylene oxide (of step c)), in order to obtain the respective alkoxylated compounds.

It has to be noted that the alkoxylation process as such, wherein polyalkylene imines or polyamines are reacted with alkylene oxides according to step a), such as ethylene oxide or propylene oxide, is known to a person skilled in the art. The same methods can be applied for the present invention within step c), or within step d), respectively, wherein the respective intermediates (I2), which were obtained by reaction with a first alkylene oxide and afterwards with lactones or hydroxyl carbon acids, undergo first an ethoxylation process (in step c)), followed by the second alkoxylation process afterwards in step d).

The conversion rates of the respective steps can be determined according to methods known to the skilled person, such as NMR-spectroscopy. For example, both the first reaction step, the second reaction step and/or the third reaction step may be monitored by $^{13}$C-NMR-spectroscopy and/or H-NMR-spectroscopy.

In connection with the second step b) of the method according to the present invention for preparing an alkoxylated polyalkylene imine or an alkoxylated polyamine, the respective intermediate (I1) as obtained in step a) is reacted with at least one lactone and/or at least one hydroxycarbon acid. This second reaction step as such is known to a person skilled in the art.

However, it is preferred within this second reaction step b) that the reaction temperature is in a range between 50 to 200° C., more preferred between 70 to 180° C., most preferred in a range between 100 to 160° C.

This second reaction step b) may be carried out in the presence of at least one solvent and/or at least one catalyst. However, it is preferred within the second reaction step b) that the respective step is carried out without any solvent and/or without any catalyst.

Suitable solvents are preferably selected from xylene, toluene, tetrahydrofuran (THF), methyl-tert. butyl ether or diethyl ether. Preferred catalysts are selected from alkali metal hydroxides or alkali metal alkoxides, such as KOMe or NaOMe.

As described above, the first, the third and/or the fourth reaction step (steps a), c) and d)) of the method according to the present invention as such (alkoxylation, in particular ethoxylation) is known to a person skilled in the art. The alkoxylation as such (first, third and fourth reaction step of the method according to the present invention) may independently from each other be carried out as a one-step reaction or the alkoxylation as such may be split into two or more individual steps.

It is preferred within the present invention that the respective step (alkoxylation) is carried out as a single step reaction in connection with steps a), c) and/or d).

In a preferred embodiment of the present invention, the alkoxylation step (a) is carried out as a single step reaction in the absence of any catalyst but in the presence of water.

In another embodiment of the present invention, the alkoxylation step (a) is carried out at least in two steps, the first step being carried out in the absence of any catalyst but in the presence of water, the second (and optionally further steps) in the presence of a catalyst but in the absence of water.

Absence of water is defined according to this invention as residual water levels of <1 wt % water, preferably <0.5 wt % water and more preferably <0.25 wt % water.

Within this preferred embodiment, the alkoxylation steps (c) and (d) are carried out in the presence of at least one catalyst and/or in the absence of water.

Within this at least two-step reaction variant of the alkoxylation step (a) and these single step reactions of the alkoxylation steps ((c) and (d)), the catalyst is preferably a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, potassium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide, potassium methoxide and potassium tert-butoxide. Typical use amounts for the base are from 0.05 to 10% by weight, in particular from 0.5 to 2% by weight, based on the total amount of polyalkylene imine or polyamine, hydroxy carbon acid and alkylene oxide.

In case that the alkoxylation step (a) is carried out at least in two steps, the first step is being carried out in the absence of any catalyst but in the presence of water. In this procedure, an initial incipient alkoxylation of the polyalkylene imine or the polyamine is carried out. In this first part of the step a), the polyalkylene imine or of the polyamine is reacted only with a portion of the total amount of alkylene oxide used, which corresponds to about 1 mole of alkylene oxide per mole of NH moiety or NH functionality, respectively. This reaction (of the first part of the step a)) is undertaken generally in the absence of a catalyst in aqueous solution at from 70 to 200° C., preferably from 80 to 160° C., under a pressure of up to 10 bar, in particular up to 8 bar. The water content in this first part of step a) is >1 wt %, preferably >5 wt % and more preferably >10 wt %.

Said second part of the alkoxylation reaction (step a) of the alternative method according to the present invention) is undertaken typically in the presence of the same type of catalyst as described above for the single step alkoxylation reactions (step (c) and (d)).

All catalyzed steps of alkoxylation in the absence of water may be undertaken in substance (variant a)) or in an organic solvent (variant b)). The process conditions specified below may be used for both steps of the alkoxylation reaction.

In variant a), the aqueous solution of the incipiently alkoxylated polyalkylene imine or polyamine obtained in the first step, after addition of the catalyst, is initially dewatered. This can be done in a simple manner by heating to from 80 to 150° C. and distilling off the water under a reduced pressure of from less than 30 mbar. The subsequent reactions with the alkylene oxides are effected typically at from 70 to 200° C., preferably from 100 to 180° C., and at a pressure of up to 10 bar, in particular up to 8 bar, and a continued stirring time of from about 0.5 to 4 h at from about 100 to 160° C. and constant pressure follows in each case.

Suitable reaction media for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these aprotic solvents. Preferred solvents are xylene and toluene.

In variant b) too, the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the alkoxylated polyalkylene imine or polyamine is obtained directly in substance and may be converted if desired to an aqueous solution. In variant b), the organic solvent is typically removed and replaced by water. The products may of course also be isolated in substance.

The amount of residues according to, for example, formula (IIa), formula (IIb) and/or formula (IIc) can be controlled by several factors, such as the stoichiometry of the educts employed, the reaction temperature within the individual steps, the amount and/or type of the catalysts employed and/or the selected solvent. In a preferred embodiment of the present invention, residues according to general formula (IIc) do not account for >50% of all residues on the alkoxylated polyalkylene imine or alkoxylated polyamine.

In a more preferred embodiment of this invention, the alkoxylated polyalkylene imine or alkoxylated polyamine as detailed before and hereinafter comprises at least 80 wt.-%, more preferably at least 90 wt.-%, even more preferably at least 95 wt.-% of residue (IIa), based on the total amount of all residues (IIa), (IIb) and (IIc) attached to the amino groups of the polyalkylene imine or the polyamine as employed in step a) for preparing the inventive compounds.

In another embodiment, the alkoxylated polyalkylene imine or alkoxylated polyamine can—if desired—be converted to solid polymer, for example pourable polymer, by drying following polymerization and optional post-treatment. Drying methods are known to a person skilled in the art.

The drying can take place, for example, by spray drying, drum drying or another warm air or contact heat drying. Drying by means of vacuum drying or freeze drying is also possible. All other methods for drying are in principle likewise suitable. Drying methods with spraying such as spray drying and by means of contact surfaces such as drum drying are preferred methods.

Spray drying by spraying into a hot gas or hot air is more preferable.

A person skilled in the art is very familiar with optimizing the particular polymer solutions or dispersions by optimizing for instance the solids content to the method of drying to be used.

However, it is also possible to dispense with drying, for example of polymer solutions or dispersions are desired.

Drying under protective gas is possible and further improves the result of the treatment.

Another subject matter of the present invention is the use of the above-mentioned alkoxylated polyalkylene imines or alkoxylated polyamines in fabric and home care products, in cosmetic formulations, as crude oil emulsion breaker, in pigment dispersions for ink jet inks, in formulations for electro plating, in cementitious compositions and/or as dispersant for agrochemical formulations, preferably in cleaning compositions and/or in fabric and home care products, in particular cleaning compositions for improved oily and fatty stain removal, wherein the cleaning composition is preferably a laundry detergent formulation and/or a manual dish wash detergent formulation, more preferably a liquid laundry detergent formulation and/or a liquid manual dish wash detergent formulation.

The inventive alkoxylated polyalkylene imines or alkoxylated polyamines can be added to cosmetic formulations, as crude oil emulsion breaker, in pigment dispersions for ink jet inks, formulations for electro plating, in cementitious compositions. However, the inventive compounds can also be added to (used in) washing or cleaning compositions.

Another subject-matter of the present invention is, therefore, a cleaning composition, fabric and home care product, industrial and institutional cleaning product, cosmetic formulation, crude oil emulsion breaker, pigment dispersion for ink jet inks, formulation for electro plating, cementitious composition and/or dispersant for agrochemical formulations, comprising at least one alkoxylated polyalkylene imine or alkoxylated polyamine, as defined above.

Preferably, it is a cleaning composition and/or fabric and home care product and/or industrial and institutional cleaning product, comprising at least one alkoxylated polyalkylene imine or alkoxylated polyamine, as defined above. In particular, it is a cleaning composition for improved oily and fatty stain removal, preferably a laundry detergent formulation and/or a manual dish wash detergent formulation, more preferably a liquid laundry detergent formulation and/or a liquid manual dish wash detergent formulation.

It is also preferred in the present invention that the cleaning composition comprises (besides at least one alkoxylated polyalkylene imine or at least one alkoxylated polyamine as described above) additionally at least one enzyme, preferably selected from one or more lipases, hydrolases, amylases, proteases, cellulases, hemicellulases, phospholipases, esterases, pectinases, lactases and peroxidases, and combinations of at least two of the foregoing types.

Another subject-matter of the present invention is, therefore, a cleaning composition such as a fabric and home care product and an industrial and institutional (I&I) cleaning product, comprising at least one polymer of the present invention, as defined above, and in particular a cleaning composition for removal of oily and fatty stains.

At least one inventive polymer as described herein is present in said inventive cleaning compositions at a concentration of 0.1 to 10, preferably from about 0.25% to 5%, more preferably from about 0.5% to about 3%, and most preferably from about 1% to about 3%, in relation to the total weight of such composition; such cleaning composition may—and preferably does—further comprise a from about 1% to about 70% by weight of a surfactant system.

Preferably, the such inventive cleaning composition is a fabric and home care product or an industrial and institutional (I&I) cleaning product, preferably a fabric and home care product, more preferably a laundry detergent or manual dish washing detergent, comprising at least one inventive polymer, and optionally further comprising at least one surfactant or a surfactant system, providing improved removal, dispersion and/or emulsification of soils and/or modification of treated surfaces and/or whiteness maintenance of treated surfaces.

Even more preferably, the cleaning compositions of the present invention comprising at least one inventive polymer, and optionally further comprising at least one surfactant or a surfactant system, are those for primary cleaning (i.e. removal of stains) within laundry and manual dish wash applications, even more specifically, for removal of oily and fatty stains such as those on fabrics and dishware, and may additionally comprise at least one enzyme selected from the list consisting of lipases, hydrolases, amylases, proteases, cellulases, hemicellulases, phospholipases, esterases, pectinases, lactases and peroxidases, and combinations of at least two of the foregoing types of enzymes.

In one embodiment of the present invention, the inventive polymer may be used for soil removal of particulate stains and/or oily and fatty stains, and additionally for whiteness maintenance, preferably in laundry care.

In one preferred embodiment, the cleaning composition of the present invention is a liquid or solid laundry detergent composition.

In another preferred embodiment, the cleaning composition of the present invention is a liquid or solid (e.g. powder or tab/unit dose) detergent composition for manual or automatic dish wash, preferably a liquid manual dish wash detergent composition.

In another embodiment, the cleaning composition of the present invention is a hard surface cleaning composition that may be used for cleaning various surfaces such as hard wood, tile, ceramic, plastic, leather, metal, glass.

In another embodiment, the cleaning composition is designed to be used in personal care and pet care compositions such as shampoo compositions, body wash formulations, liquid or solid soaps.

In one embodiment, the inventive polymers of the present invention may be utilized in cleaning compositions comprising a surfactant system comprising C10-C15 alkyl benzene sulfonates (LAS) as the primary surfactant and one or more additional surfactants selected from non-ionic, cationic, amphoteric, zwitterionic or other anionic surfactants, or mixtures thereof.

In a further embodiment, the inventive polymers of the present invention may be utilized in cleaning compositions, such as laundry detergents of any kind, and the like, comprising C8-C18 linear or branched alkyl ethersulfates with 1-5 ethoxy-units as the primary surfactant and one or more additional surfactants selected from non-ionic, cationic, amphoteric, zwitterionic or other anionic surfactants, or mixtures thereof.

In a further embodiment the inventive polymers of the present invention may be utilized in cleaning compositions, such as laundry detergents of any kind, and the like, comprising C12-C18 alkyl ethoxylate surfactants with 5-10 ethoxy-units as the primary surfactant and one or more additional surfactants selected from anionic, cationic, amphoteric, zwitterionic or other non-ionic surfactants, or mixtures thereof.

In one embodiment of the present invention, the polymer according to the invention is a component of a cleaning composition, such as preferably a laundry or a dish wash formulation, more preferably a liquid laundry or manual dish wash formulation, that each additionally comprise at least one surfactant, preferably at least one anionic surfactant. The selection of the additional surfactants in these embodiments may be dependent upon the application and the desired benefit.

Description of Cleaning Compositions, Formulations and their Ingredients

The phrase "cleaning composition" as used herein includes compositions and formulations designed for cleaning soiled material. Such compositions and formulations include those designed for cleaning soiled material or surfaces of any kind.

Compositions for "industrial and institutional cleaning" includes such cleaning compositions being designed for use in industrial and institutional cleaning, such as those for use of cleaning soiled material or surfaces of any kind, such as hard surface cleaners for surfaces of any kind, including tiles, carpets, PVC-surfaces, wooden surfaces, metal surfaces, lacquered surfaces.

"Compositions for Fabric and Home Care" include cleaning compositions including but not limited to laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation, preferably during the wash cycle of the laundering or dish washing operation.

The cleaning compositions of the invention may be in any form, namely, in the form of a liquid; a solid such as a powder, granules, agglomerate, paste, tablet, pouches, bar, gel; an emulsion; types delivered in dual- or multi-compartment containers; single-phase or multi-phase unit dose; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a user or consumer; and other homogeneous, non-homogeneous or single-phase or multiphase cleaning product forms.

The liquid cleaning compositions of the present invention preferably have a viscosity of from 50 to 10000 mPa*s; liquid manual dish wash cleaning compositions (also liquid manual "dish wash compositions") have a viscosity of preferably from 100 to 10000 mPa*s, more preferably from 200 to 5000 mPa*s and most preferably from 500 to 3000 mPa*s at 20 1/s and 20° C.; liquid laundry cleaning compositions have a viscosity of preferably from 50 to 3000 mPa*s, more preferably from 100 to 1500 mPa*s and most preferably from 200 to 1000 mPa*s at 20 1/s and 20° C.

The liquid cleaning compositions of the present invention may have any suitable pH— value. Preferably the pH of the composition is adjusted to between 4 and 14. More preferably the composition has a pH of from 6 to 13, even more preferably from 6 to 10, most preferably from 7 to 9. The pH of the composition can be adjusted using pH modifying ingredients known in the art and is measured as a 10% product concentration in demineralized water at 25° C. For example, NaOH may be used and the actual weight % of NaOH may be varied and trimmed up to the desired pH such as pH 8.0. In one embodiment of the present invention, a pH >7 is adjusted by using amines, preferably alkanolamines, more preferably triethanolamine.

Cleaning compositions such as fabric and home care products and formulations for industrial and institutional cleaning, more specifically such as laundry and manual dish wash detergents, are known to a person skilled in the art. Any composition etc. known to a person skilled in the art, in connection with the respective use, can be employed within the context of the present invention by including at least one inventive polymer, preferably at least one polymer in amounts suitable for expressing a certain property within such a composition, especially when such a composition is used in its area of use. One aspect of the present invention is also the use of the inventive polymers as additives for detergent formulations, particularly for liquid detergent formulations, preferably concentrated liquid detergent formulations, or single mono doses for laundry.

The cleaning compositions of the invention may—and preferably do—contain adjunct cleaning additives (also abbreviated herein as "adjuncts"), such adjuncts being preferably in addition to a surfactant system as defined before.

Suitable adjunct cleaning additives include builders, cobuilders, structurants or thickeners, clay soil removal/anti-redeposition agents, polymeric soil release agents, dispersants such as polymeric dispersing agents, polymeric grease cleaning agents, solubilizing agents, chelating agents, enzymes, enzyme stabilizing systems, bleaching compounds, bleaching agents, bleach activators, bleach catalysts, brighteners, malodor control agents, pigments, dyes, opacifiers, hueing agents, dye transfer inhibiting agents, chelating agents, suds boosters, suds suppressors (anti-foams), color speckles, silver care, anti-tarnish and/or anticorrosion agents, alkalinity sources, pH adjusters, pH-buffer agents, hydrotropes, scrubbing particles, antibacterial agents, anti-oxidants, softeners, carriers, processing aids, pro-perfumes, and perfumes.

Liquid cleaning compositions additionally may comprise—and preferably do comprise at least one of—rheology control/modifying agents, emollients, humectants, skin rejuvenating actives, and solvents.

Solid compositions additionally may comprise—and preferably do comprise at least one of—fillers, bleaches, bleach activators and catalytic materials.

Suitable examples of such cleaning adjuncts and levels of use are found in WO 99/05242, U.S. Pat. Nos. 5,576,282, 6,306,812 B1 and 6,326,348 B1.

Those of ordinary skill in the art will understand that a detersive surfactant encompasses any surfactant or mixture of surfactants that provide cleaning, stain removing, or laundering benefit to soiled material.

Hence, the cleaning compositions of the invention such as fabric and home care products, and formulations for industrial and institutional cleaning, more specifically such as laundry and manual dish wash detergents, preferably additionally comprise a surfactant system and, more preferably, also further adjuncts, as the one described above and below in more detail.

The surfactant system may be composed from one surfactant or from a combination of surfactants selected from anionic surfactants, non-ionic surfactants, cationic surfactants, zwitterionic surfactants, amphoteric surfactants, and mixtures thereof. Those of ordinary skill in the art will understand that a surfactant system for detergents encompasses any surfactant or mixture of surfactants that provide cleaning, stain removing, or laundering benefit to soiled material.

The cleaning compositions of the invention preferably comprise a surfactant system in an amount sufficient to provide desired cleaning properties. In some embodiments, the cleaning composition comprises, by weight of the composition, from about 1% to about 70% of a surfactant system. In other embodiments, the liquid cleaning composition comprises, by weight of the composition, from about 2% to about 60% of the surfactant system. In further embodiments, the cleaning composition comprises, by weight of the composition, from about 5% to about 30% of the surfactant system. The surfactant system may comprise a detersive surfactant selected from anionic surfactants, non-ionic surfactants, cationic surfactants, zwitterionic surfactants, amphoteric surfactants, and mixtures thereof.

(a) Laundry Compositions

In laundry formulations, anionic surfactants contribute usually by far the largest share of surfactants within such formulation. Hence, preferably, the inventive cleaning compositions for use in laundry comprise at least one anionic surfactant and optionally further surfactants selected from any of the surfactants classes described herein, preferably from non-ionic surfactants and/or amphoteric surfactants and/or zwitterionic surfactants and/or cationic surfactants.

Nonlimiting examples of anionic surfactants—which may be employed also in combinations of more than one surfactant—useful herein include C9-C20 linear alkylbenzenesulfonates (LAS), C10-C20 primary, branched chain and random alkyl sulfates (AS); C10-C18 secondary (2,3) alkyl sulfates; C10-C18 alkyl alkoxy sulfates (AExS) wherein x is from 1 to 30; C10-C18 alkyl alkoxy carboxylates comprising 1 to 5 ethoxy units; mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

Preferred examples of suitable anionic surfactants are alkali metal and ammonium salts of $C_8$-$C_{12}$-alkyl sulfates, of $C_{12}$-$C_{18}$-fatty alcohol ether sulfates, of $C_{12}$-$C_{18}$-fatty alcohol polyether sulfates, of sulfuric acid half-esters of ethoxylated $C_4$-$C_{12}$-alkylphenols (ethoxylation: 3 to 50 mol of ethylene oxide/mol), of $C_{12}$-$C_{18}$-alkylsulfonic acids, of $C_{12}$-$C_{18}$ sulfo fatty acid alkyl esters, for example of $C_{12}$-$C_{18}$ sulfo fatty acid methyl esters, of $C_{10}$-$C_{18}$-alkylarylsulfonic acids, preferably of n-$C_{10}$-$C_{18}$-alkylbenzene sulfonic acids, of $C_{10}$-$C_{18}$ alkyl alkoxy carboxylates and of soaps such as for example $C_8$-$C_{24}$-carboxylic acids. Preference is given to the alkali metal salts of the aforementioned compounds, particularly preferably the sodium salts.

In one embodiment of the present invention, anionic surfactants are selected from n-$C_{10}$-$C_{18}$-alkylbenzene sulfonic acids and from fatty alcohol polyether sulfates, which, within the context of the present invention, are in particular sulfuric acid half-esters of ethoxylated $C_{12}$-$C_{18}$-alkanols (ethoxylation: 1 to 50 mol of ethylene oxide/mol), preferably of n-$C_{12}$-$C_{18}$-alkanols.

In one embodiment of the present invention, also alcohol polyether sulfates derived from branched (i.e. synthetic) $C_{11}$-$C_{18}$-alkanols (ethoxylation: 1 to 50 mol of ethylene oxide/mol) may be employed.

Preferably, the alkoxylation group of both types of alkoxylated alkyl sulfates, based on $C_{12}$-$C_{18}$-fatty alcohols or based on branched (i.e. synthetic) $C_{11}$-$C_{18}$-alcohols, is an ethoxylation group and an average ethoxylation degree of any of the alkoxylated alkyl sulfates is 1 to 5, preferably 1 to 3.

Preferably, the laundry detergent formulation of the present invention comprises from at least 1 wt % to 50 wt %, preferably in the range from greater than or equal to about 2 wt % to equal to or less than about 30 wt %, more preferably in the range from greater than or equal to 3 wt % to less than or equal to 25 wt %, and most preferably in the range from greater than or equal to 5 wt % to less than or equal to 25 wt % of one or more anionic surfactants as described above, based on the particular overall composition, including other components and water and/or solvents.

In a preferred embodiment of the present invention, anionic surfactants are selected from C10-C15 linear alkylbenzenesulfonates, C10-C18 alkylethersulfates with 1-5 ethoxy units and C10-C18 alkylsulfates.

Non-limiting examples of non-ionic surfactants—which may be employed also in combinations of more than one other surfactant-include: C8-C18 alkyl ethoxylates, such as, NEODOL® non-ionic surfactants from Shell; ethylenoxide/propylenoxide block alkoxylates as PLURONIC® from BASF; C14-C22 mid-chain branched alkyl alkoxylates, BAEx, wherein x is from 1 to 30, as discussed in U.S. Pat. Nos. 6,153,577, 6,020,303 and 6,093,856; alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Preferred examples of non-ionic surfactants are in particular alkoxylated alcohols and alkoxylated fatty alcohols, di- and multiblock copolymers of ethylene oxide and propylene oxide and reaction products of sorbitan with ethylene oxide or propylene oxide, furthermore alkylphenol ethoxylates, alkyl glycosides, polyhydroxy fatty acid amides (glucamides). Examples of (additional) amphoteric surfactants are so-called amine oxides.

Preferred examples of alkoxylated alcohols and alkoxylated fatty alcohols are, for example, compounds of the general formula (A)

[formula (A)]

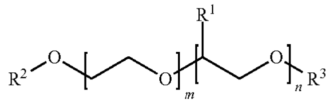

in which the variables are defined as follows:

R1 is selected from linear C1-C10-alkyl, preferably ethyl and particularly preferably methyl, R2 is selected from C8-C22-alkyl, for example n-C8H17, n-C10H21, n-C12H25, n-C14H29, n-C16H33 or n-C18H37, R3 is selected from C1-C10-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl, m and n are in the range from zero to 300, where the sum of n and m is at least one. Preferably, m is in the range from 1 to 100 and n is in the range from 0 to 30.

Here, compounds of the general formula (A) may be block copolymers or random copolymers, preference being given to block copolymers.

Other preferred examples of alkoxylated alcohols and alkoxylated fatty alcohols are, for example, compounds of the general formula (B)

[formula (B)]

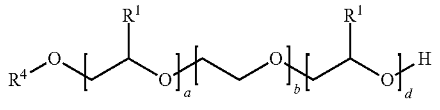

in which the variables are defined as follows:

$R^1$ is identical or different and selected from linear $C_1$-$C_4$-alkyl, preferably identical in each case and ethyl and particularly preferably methyl, $R^4$ is selected from $C_6$-$C_{20}$-alkyl, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$, a is a number in the range from zero to 6, preferably 1 to 6, b is a number in the range from zero to 20, preferably 4 to 20, d is a number in the range from 4 to 25.

Preferably, at least one of a and b is greater than zero.

Here, compounds of the general formula (B) may be block copolymers or random copolymers, preference being given to block copolymers.

Further suitable non-ionic surfactants are selected from di- and multiblock copolymers, composed of ethylene oxide and propylene oxide. Further suitable non-ionic surfactants are selected from ethoxylated or propoxylated sorbitan esters. Alkylphenol ethoxylates or alkyl polyglycosides or polyhydroxy fatty acid amides (glucamides) are likewise suitable. An overview of suitable further non-ionic surfactants can be found in EP-A 0 851 023 and in DE-A 198 19 187.

Mixtures of two or more different non-ionic surfactants may of course also be present.

In a preferred embodiment of the present invention, non-ionic surfactants are selected from C12/14 and C16/18 fatty alkoholalkoxylates, C13/15 oxoalkoholalkoxylates, C13-alkoholalkoxylates, and 2-propylheptylalkoholalkoxylates, each of them with 3-15 ethoxy units, preferably 5-10 ethoxy units, or with 1-3 propoxy- and 2-15 ethoxy units.

Non-limiting examples of amphoteric surfactants—which may be employed also in combinations of more than one other surfactant—include: water-soluble amine oxides containing one alkyl moiety of from about 8 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704 and 4,133,779. Suitable surfactants include thus so-called amine oxides, such as lauryl dimethyl amine oxide ("lauramine oxide").

Preferred examples of amphoteric surfactants are amine oxides. Preferred amine oxides are alkyl dimethyl amine oxides or alkyl amido propyl dimethyl amine oxides, more preferably alkyl dimethyl amine oxides and especially coco dimethyl amino oxides.

Amine oxides may have a linear or mid-branched alkyl moiety. Typical linear amine oxides include water-soluble amine oxides containing one R1=C8-18 alkyl moiety and two R2 and R3 moieties selected from the group consisting of C1-C3 alkyl groups and C1-C3 hydroxyalkyl groups. Preferably, the amine oxide is characterized by the formula

R1-N(R2)(R3)-O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides. Preferred amine oxides include linear C10, linear C10-C12, and linear C12-C14 alkyl dimethyl amine oxides. As used herein "mid-branched" means that the amine oxide has one alkyl moiety having n1 carbon atoms with one alkyl branch on the alkyl moiety having n2 carbon atoms. The alkyl branch is located on the alpha carbon from the nitrogen on the alkyl moiety. This type of branching for the amine oxide is also known in the art as an internal amine oxide. The total sum of n1 and n2 is from 10 to 24 carbon atoms, preferably from 12 to 20, and more preferably from 10 to 16. The number of carbon atoms for the one alkyl moiety (n1) should be approximately the same number of carbon atoms as the one alkyl branch (n2) such that the one alkyl moiety and the one alkyl branch are symmetric. As used herein "symmetric" means that (n1-n2) is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-C3 alkyl, a C1-C3 hydroxyalkyl group, or a polyethylene oxide group containing an average of from about 1 to about 3 ethylene oxide groups. Preferably the two moieties are selected from a C1-C3 alkyl, more preferably both are selected as a C1 alkyl.

In a preferred embodiment of the present invention, amphoteric surfactants are selected from C8-C18 alkyl-dimethyl aminoxides and C8-C18 alkyl-di(hydroxyethyl) aminoxide.

Cleaning compositions may also contain zwitterionic surfactants—which may be employed also in combinations of more than one other surfactant.

Suitable zwitterionic surfactants include betaines, such as alkyl betaines, alkylamidobetaine, amidazoliniumbetaine, sulfobetaine (INCI Sultaines) as well as the phosphobetaines. Examples of suitable betaines and sulfobetaines are the following (designated in accordance with INCI): Almond amidopropyl of betaines, Apricotamidopropyl betaines, Avocadamidopropyl of betaines, Babassuamidopropyl of betaines, Behenamidopropyl betaines, Behenyl of betaines, Canol amidopropyl betaines, Capryl/Capramidopropyl betaines, Carnitine, Cetyl of betaines, Cocamidoethyl of betaines, Cocamidopropyl betaines, Cocamidopropyl Hydroxysultaine, Coco betaines, Coco Hydroxysultaine, Coco/Oleam idopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucamidopropyl Hydroxysultaine, Hydrogenated Tallow of betaines, Isostearamid-opropyl betaines, Lauramidopropyl betaines, Lauryl of betaines, Lauryl Hydroxysultaine, Lauryl Sultaine, Milkamidopropyl betaines, Minkamidopropyl of betaines, Myristamidopropyl betaines, Myristyl of betaines, Oleamidopropyl betaines, Oleamidopropyl Hydroxysultaine, Oleyl of betaines, Olivamidopropyl of betaines, Palmamidopropyl betaines, Palmitamidopropyl betaines, Palmitoyl Carnitine, Palm Kernelamidopropyl betaines, Polytetrafluoroethylene Acetoxypropyl of betaines, Ricinoleam idopropyl betaines, Sesamidopropyl betaines, Soyamidopropyl betaines, Stearamidopropyl betaines, Stearyl of betaines, Tallowamidopropyl betaines, Tallowamidopropyl Hydroxysultaine, Tallow of betaines, Tallow Dihydroxyethyl of betaines, Undecylenamidopropyl betaines and Wheat Germamidopropyl betaines.

Preferred betaines are, for example, $C_{12}$-$C_{18}$-alkyl-betaines and sulfobetaines. The zwitterionic surfactant preferably is a betaine surfactant, more preferable a Cocoamidopropylbetaine surfactant.

Non-limiting examples of cationic surfactants—which may be employed also in combinations of more than one other surfactant—include: the quaternary ammonium surfactants, which can have up to 26 carbon atoms include: alkoxylated quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, specifically amido propyldimethyl amine (APA).

Compositions according to the invention may comprise at least one builder. In the context of the present invention, no distinction will be made between builders and such components elsewhere called "co-builders". Examples of builders are complexing agents, hereinafter also referred to as complexing agents, ion exchange compounds, and precipitating agents. Builders are selected from citrate, phosphates, silicates, carbonates, phosphonates, amino carboxylates and polycarboxylates.

In the context of the present invention, the term citrate includes the mono- and the dialkali metal salts and in particular the mono- and preferably the trisodium salt of citric acid, ammonium or substituted ammonium salts of citric acid as well as citric acid. Citrate can be used as the anhydrous compound or as the hydrate, for example as sodium citrate dihydrate. Quantities of citrate are calculated referring to anhydrous trisodium citrate.

The term phosphate includes sodium metaphosphate, sodium orthophosphate, sodium hydrogenphosphate, sodium pyrophosphate and polyphosphates such as sodium tripolyphosphate. Preferably, however, the composition according to the invention is free from phosphates and polyphosphates, with hydrogenphosphates being subsumed, for example free from trisodium phosphate, pentasodium tripolyphosphate and hexasodium metaphosphate ("phosphate-free"). In connection with phosphates and polyphosphates, "free from" should be understood within the context of the present invention as meaning that the content of phosphate and polyphosphate is in total in the range from 10 ppm to 0.2% by weight of the respective composition, determined by gravimetry.

The term carbonates includes alkali metal carbonates and alkali metal hydrogen carbonates, preferred are the sodium salts. Particularly preferred is $Na_2CO_3$. Examples of phosphonates are hydroxyalkanephosphonates and aminoalkanephosphonates. Among the hydroxyalkanephosphonates, the 1-hydroxyethane-1,1-diphosphonate (HEDP) is of particular importance as builder. It is preferably used as sodium salt, the disodium salt being neutral and the tetrasodium salt being alkaline (pH 9). Suitable aminoalkanephosphonates are preferably ethylene diaminetetra-methylenephosphonate (EDTMP), diethylenetriaminepentamethylenephosphonate (DTPMP), and also their higher homologues. They are preferably used in the form of the neutrally reacting sodium salts, e.g. as hexasodium salt of EDTMP or as hepta- and octa-sodium salts of DTPMP.

Examples of amino carboxylates and polycarboxylates are nitrilotriacetates, ethylene diamine tetraacetate, diethylene triamine pentaacetate, triethylene tetraamine hexaacetate, propylene diamines tetraacetic acid, ethanol-diglycines, methylglycine diacetate, and glutamine diacetate. The term amino carboxylates and polycarboxylates also include their respective non-substituted or substituted ammonium salts and the alkali metal salts such as the sodium salts, in particular of the respective fully neutralized compound.

Silicates in the context of the present invention include in particular sodium disilicate and sodium metasilicate, alumosilicates such as for example zeolites and sheet silicates, in particular those of the formula $\alpha$-$Na_2Si_2O_5$, $\beta$-$Na_2Si_2O_5$, and $\delta$-$Na_2Si_2O_5$.

Compositions according to the invention may contain one or more builder selected from materials not being mentioned above. Examples of builders are $\alpha$-hydroxypropionic acid and oxidized starch.

In one embodiment of the present invention, builder is selected from polycarboxylates. The term "polycarboxylates" includes non-polymeric polycarboxylates such as succinic acid, $C_2$-$C_{16}$-alkyl disuccinates, $C_2$-$C_{16}$-alkenyl disuccinates, ethylene diamine N,N'-disuccinic acid, tartaric acid diacetate, alkali metal malonates, tartaric acid monoacetate, propanetricarboxylic acid, butanetetracarboxylic acid and cyclopentanetetracarboxylic acid.

Oligomeric or polymeric polycarboxylates are for example polyaspartic acid or in particular alkali metal salts of (meth)acrylic acid homopolymers or (meth)acrylic acid copolymers.

Suitable co-monomers are monoethylenically unsaturated dicarboxylic acids such as maleic acid, fumaric acid, maleic anhydride, itaconic acid and citraconic acid. A suitable polymer is in particular polyacrylic acid, which preferably has a weight-average molecular weight $M_w$ in the range from 2000 to 40 000 g/mol, preferably 2000 to 10 000 g/mol, in particular 3000 to 8000 g/mol. Further suitable copolymeric polycarboxylates are in particular those of acrylic acid with methacrylic acid and of acrylic acid or methacrylic acid with maleic acid and/or fumaric acid.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilically or hydrophobically modified co-monomer as listed below.

Suitable hydrophobic co-monomers are, for example, isobutene, diisobutene, butene, pentene, hexene and styrene, olefins with ten or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having on average 12 to 100 carbon atoms per molecule.

Suitable hydrophilic co-monomers are monomers with sulfonate or phosphonate groups, and also non-ionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth) acrylate. Polyalkylene glycols here can comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Moreover, amphoteric polymers can also be used as builders.

Compositions according to the invention can comprise, for example, in the range from in total 0.1 to 70% by weight, preferably 10 to 50% by weight, preferably up to 20% by weight, of builder(s), especially in the case of solid formulations. Liquid formulations according to the invention preferably comprise in the range of from 0.1 to 8% by weight of builder.

Formulations according to the invention can comprise one or more alkali carriers. Alkali carriers ensure, for example, a pH of at least 9 if an alkaline pH is desired. Of suitability are, for example, the alkali metal carbonates, the alkali metal hydrogen carbonates, and alkali metal metasilicates mentioned above, and, additionally, alkali metal hydroxides. A preferred alkali metal is in each case potassium, particular preference being given to sodium. In one embodiment of the present invention, a pH >7 is adjusted by using amines, preferably alkanolamines, more preferably triethanolamine.

In one embodiment of the present invention, the laundry formulation according to the invention comprises additionally at least one enzyme.

Useful enzymes are, for example, one or more hydrolases selected from lipases, amylases, proteases, cellulases, hemicellulases, phospholipases, esterases, pectinases, lactases and peroxidases, and combinations of at least two of the foregoing types.

Such enzyme(s) can be incorporated at levels sufficient to provide an effective amount for cleaning. The preferred amount is in the range from 0.001% to 5% of active enzyme by weight in the detergent composition according to the invention. Together with enzymes also enzyme stabilizing systems may be used such as for example calcium ions, boric acid, boronic acid, propylene glycol and short chain carboxylic acids. In the context of the present invention, short chain carboxylic acids are selected from monocarboxylic acids with 1 to 3 carbon atoms per molecule and from dicarboxylic acids with 2 to 6 carbon atoms per molecule. Preferred examples are formic acid, acetic acid, propionic acid, oxalic acid, succinic acid, $HOOC(CH_2)_3COOH$, adipic acid and mixtures from at least two of the foregoing, as well as the respective sodium and potassium salts.

Compositions according to the invention may comprise one or more bleaching agent (bleaches).

Preferred bleaches are selected from sodium perborate, anhydrous or, for example, as the monohydrate or as the tetrahydrate or so-called dihydrate, sodium percarbonate, anhydrous or, for example, as the monohydrate, and sodium persulfate, where the term “persulfate” in each case includes the salt of the peracid $H_2SO_5$ and also the peroxodisulfate.

In this connection, the alkali metal salts can in each case also be alkali metal hydrogen carbonate, alkali metal hydrogen perborate and alkali metal hydrogen persulfate. However, the dialkali metal salts are preferred in each case.

Formulations according to the invention can comprise one or more bleach catalysts. Bleach catalysts can be selected from oxaziridinium-based bleach catalysts, bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Formulations according to the invention can comprise one or more bleach activators, for example tetraacetyl ethylene diamine, tetraacetylmethylene diamine, tetra-acetylglycoluril, tetraacetylhexylene diamine, acylated phenolsulfonates such as for example n-nonanoyl- or isononanoyloxybenzene sulfonates, N-methylmorpholinium-acetonitrile salts (“MMA salts”), trimethylammonium acetonitrile salts, N-acylimides such as, for example, N-nonanoylsuccinimide, 1,5-diacetyl-2,2-dioxohexahydro-1,3,5-triazine (“DADHT”) or nitrile quats (trimethylammonium acetonitrile salts).

Formulations according to the invention can comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, formulations according to the invention comprise in total in the range from 0.1 to 1.5% by weight of corrosion inhibitor.

Formulations according to the invention may also comprise further cleaning polymers and/or soil release polymers.

The additional cleaning polymers may include, without limitation, "multifunctional polyethylene imines" (for example BASF's Sokalan® HP20) and/or "multifunctional diamines" (for example BASF's Sokalan® HP96). Such multifunctional polyethylene imines are typically ethoxylated polyethylene imines with a weight-average molecular weight $M_w$ in the range from 3000 to 250000, preferably 5000 to 200000, more preferably 8000 to 100000, more preferably 8000 to 50000, more preferably 10000 to 30000, and most preferably 10000 to 20000 g/mol. Suitable multifunctional polyethylene imines have 80 wt % to 99 wt %, preferably 85 wt % to 99 wt %, more preferably 90 wt % to 98 wt %, most preferably 93 wt % to 97 wt % or 94 wt % to 96 wt % ethylene oxide side chains, based on the total weight of the materials. Ethoxylated polyethylene imines are typically based on a polyethylene imine core and a polyethylene oxide shell. Suitable polyethylene imine core molecules are polyethylene imines with a weight-average molecular weight $M_w$ in the range of 500 to 5000 g/mol. Preferably employed is a molecular weight from 500 to 1000 g/mol, even more preferred is a $M_w$ of 600 to 800 g/mol. The ethoxylated polymer then has on average 5 to 50, preferably 10 to 35 and even more preferably 20 to 35 ethylene oxide (EO) units per NH-functional group.

Suitable multifunctional diamines are typically ethoxylated C2 to C12 alkylene diamines, preferably hexamethylene diamine, which are further quaternized and optionally sulfated. Typical multifunctional diamines have a weight-average molecular weight $M_w$ in the range from 2000 to 10000, more preferably 3000 to 8000, and most preferably 4000 to 6000 g/mol. In a preferred embodiment of the invention, ethoxylated hexamethylene diamine, furthermore quaternized and sulfated, may be employed, which contains on average 10 to 50, preferably 15 to 40 and even more preferably 20 to 30 ethylene oxide (EO) groups per NH-functional group, and which preferably bears two cationic ammonium groups and two anionic sulfate groups.

In a preferred embodiment of the present invention, the cleaning compositions may contain at least one multifunctional polyethylene imine and/or at least one multifunctional diamine to improve the cleaning performance, such as preferably improve the stain removal ability, especially the primary detergency of particulate stains on polyester fabrics of laundry detergents. The multifunctional polyethylene imines or multifunctional diamines or mixtures thereof according to the descriptions above may be added to the laundry detergents and cleaning compositions in amounts of generally from 0.05 to 15 wt %, preferably from 0.1 to 10 wt % and more preferably from 0.25 to 5 wt % and even as low as up to 2 wt. %, based on the particular overall composition, including other components and water and/or solvents.

Thus, one aspect of the present invention is a laundry detergent composition, in particular a liquid laundry detergent, comprising (i) at least one inventive polymer and (ii) at least one compound selected from multifunctional polyethylene imines and multifunctional diamines and mixtures thereof.

In one embodiment of the present invention, the ratio of the at least one inventive polymer and (ii) the at least one compound selected from multifunctional polyethylene imines and multifunctional diamines and mixtures thereof, is from 10:1 to 1:10, preferably from 5:1 to 1:5 and more preferably from 3:1 to 1:3.

Laundry formulations comprising the inventive polymer may also comprise at least one antimicrobial agent.

One or more antimicrobial agents and/or preservatives as listed in patent WO2021/115912 A1 ("Formulations comprising a hydrophobically modified polyethyleneimine and one or more enzymes") pages 35 to 39 may be employed.

Especially preferred are the following antimicrobial agents and/or preservatives: 4,4'-dichloro 2-hydroxydiphenyl ether (CAS-No. 3380-30-1), further names: 5-chloro-2-(4-chlorophenoxy) phenol, Diclosan, DCPP, which is commercially available as a solution of 30 wt % of 4,4'-dichloro 2-hydroxydiphenyl ether in 1,2 propyleneglycol under the trade name Tinosan® HP 100 (BASF);

2-Phenoxyethanol (CAS-no. 122-99-6, further names: Phenoxyethanol, Methylphenyl-glycol, Phenoxetol, ethylene glycol phenyl ether, Ethylene glycol monophenyl ether, Protectol® PE);

2-bromo-2-nitropropane-1,3-diol (CAS-No. 52-51-7, further names: 2-bromo-2-nitro-1,3-propanediol, Bronopol®, Protectol® BN, Myacide AS);

Glutaraldehyde (CAS-No. 111-30-8, further names: 1-5-pentandial, pentane-1,5-dial, glutaral, glutardialdehyde, Protectol® GA, Protectol® GA 50, Myacide® GA); Glyoxal (CAS No. 107-22-2; further names: ethandial, oxylaldehyde, 1,2-ethandial, Protectol® GL);

2-butyl-benzo[d]isothiazol-3-one (BBIT, CAS No. 4299-07-4);

2-methyl-2H-isothiazol-3-one (MIT, CAS No 2682-20-4);

2-octyl-2H-isothiazol-3-one (OIT, CAS No. 26530-20-1);

5-Chloro-2-methyl-2H-isothiazol-3-one (CIT, CMIT, CAS No. 26172-55-4);

Mixture of 5-chloro-2-methyl-2H-isothiazol-3-one (CMIT, EINECS 247-500-7) and 2-methyl-2H-isothiazol-3-one (MIT, EINECS 220-239-6) (Mixture of CMIT/MIT, CAS No. 55965-84-9);

1,2-benzisothiazol-3(2H)-one (BIT, CAS No. 2634-33-5);

Hexa-2,4-dienoic acid (Sorbic acid, CAS No. 110-44-1) and its salts, e.g. calcium sorbate, sodium sorbate Potassium (E,E)-hexa-2,4-dienoate (Potassium Sorbate, CAS No. 24634-61-5);

Lactic acid and its salts;

L-(+)-lactic acid (CAS No. 79-33-4);

Benzoic acid and its sodium salt (CAS No 65-85-0, CAS No. 532-32-1) and salts of benzoic acid e.g. ammonium benzoate, calcium benzoate, magnesium benzoate, MEA-benzoate, potassium benzoate;

Salicylic acid and its salts, e.g. calcium salicylate, magnesium salicylate, MEA salicylate, sodium salicylate, potassium salicylate, TEA salicylate;

Benzalkonium chloride, bromide and saccharinate, e.g. benzalkonium chloride, benzalkonium bromide, benzalkonium saccharinate (CAS Nos 8001-54-5, 63449-41-2, 91080-29-4, 68989-01-5, 68424-85-1, 68391-01-5, 61789-y71-7, 85409-22-9);

Didecyldimethylammonium chloride (DDAC, CAS No. 68424-95-3 and CAS No. 7173-51-5);

N-(3-aminopropyl)-N-dodecylpropane-1,3-diamine (Diamine, CAS No. 2372-82-9);

Peracetic acid (CAS No. 79-21-0);

Hydrogen peroxide (CAS No. 7722-84-1);

The further antimicrobial agent or preservative is added to the composition in a concentration of 0.001 to 10% relative to the total weight of the composition.

Preferably, the composition contains 2-Phenoxyethanol in a concentration of 0.1 to 2% or 4,4'-dichloro 2-hydroxydiphenyl ether (DCPP) in a concentration of 0.005 to 0.6%.

The invention thus further pertains to a method of preserving an aqueous composition according to the invention against microbial contamination or growth, which method comprises addition of 2-Phenoxyethanol.

The invention thus further pertains to a method of providing an antimicrobial effect on textiles after treatment with a solid laundry detergent e.g. powders, granulates, capsules, tablets, bars etc.), a liquid laundry detergent, a softener or an after rinse containing 4,4'-dichloro 2-hydroxydiphenyl ether (DCPP).

Formulations according to the invention may also comprise water and/or additional organic solvents, e.g. ethanol or propylene glycol.

Further optional ingredients may be but are not limited to viscosity modifiers, cationic surfactants, foam boosting or foam reducing agents, perfumes, dyes, optical brighteners, and dye transfer inhibiting agents.

(b) Dish Wash Compositions

Another aspect of the present invention is also a dish wash composition, comprising at least one inventive polymer as described above.

Thus, an aspect of the present invention is also the use of the inventive polymer as described above, in dish wash applications, such as manual or automated dish wash applications.

Dish wash compositions according to the invention can be in the form of a liquid, semi-liquid, cream, lotion, gel, or solid composition, solid embodiments encompassing, for example, powders and tablets. Liquid compositions are typically preferred for manual dish wash applications, whereas solid formulations and pouch formulations (where the pouches may contain also solids in addition to liquid ingredients) are typically preferred for automated dish washing compositions; however, in some areas of the world also liquid automated dish wash compositions are used and are thus of course also encompassed by the term "dish wash composition".

The dish wash compositions are intended for direct or indirect application onto dishware and metal and glass surfaces, such as drinking and other glasses, beakers, dish and cooking ware like pots and pans, and cutlery such as forks, spoons, knives and the like. The inventive method of cleaning dishware, metal and/or glass surfaces comprises the step of applying the dish wash cleaning composition, preferably in liquid form, onto the surface, either directly or by means of a cleaning implement, i.e., in neat form. The composition is applied directly onto the surface to be treated and/or onto a cleaning device or implement such as a dish cloth, a sponge or a dish brush and the like without undergoing major dilution (immediately) prior to the application. The cleaning device or implement is preferably wet before or after the composition is delivered to it. In the method of the invention, the composition can also be applied in diluted form.

Both neat and dilute application give rise to superior cleaning performance, i.e. the formulations of the invention containing at least one inventive polymer exhibit excellent degreasing properties. The effort of removing fat and/or oily soils from the dishware, metal and/or glass surfaces is decreased due to the presence of the inventive polymer, even when the level of surfactant used is lower than in conventional compositions.

Preferably the composition is formulated to provide superior grease cleaning (degreasing) properties, long-lasting suds and/or improved viscosity control at decreased temperature exposures; preferably at least two, more preferably all three properties are present in the inventive dish wash composition. Optional—preferably present—further benefits of the inventive manual dish wash composition include soil removal, shine, and/or hand care; more preferably at least two and most preferably all three further benefits are present in the inventive dish wash composition.

In one embodiment of the present invention, the inventive polymer is one component of a manual dish wash formulation that additionally comprises at least one surfactant, preferably at least one anionic surfactant.

In another embodiment of the present invention, the inventive polymer is one component of a manual dish wash formulation that additionally comprises at least one anionic surfactant and at least one other surfactant, preferably selected from amphoteric surfactants and/or zwitterionic surfactants. In a preferred embodiment of the present invention, the manual dish wash formulations contain at least one amphoteric surfactant, preferably an amine oxide, or at least one zwitterionic surfactant, preferably a betaine, or mixtures thereof, to aid in the foaming, detergency, and/or mildness of the detergent composition.

Examples of suitable anionic surfactants are already mentioned above for laundry compositions.

Preferred anionic surfactants for dish wash compositions are selected from C10-C15 linear alkylbenzenesulfonates, C10-C18 alkylethersulfates with 1-5 ethoxy units and C10-C18 alkylsulfates.

Preferably, the manual dish wash detergent formulation of the present invention comprises from at least 1 wt % to 50 wt %, preferably in the range from greater than or equal to about 3 wt % to equal to or less than about 35 wt %, more preferably in the range from greater than or equal to 5 wt % to less than or equal to 30 wt %, and most preferably in the range from greater than or equal to 5 wt % to less than or equal to 20 wt % of one or more anionic surfactants as described above, based on the particular overall composition, including other components and water and/or solvents.

Dish wash compositions according to the invention may comprise at least one amphoteric surfactant.

Examples of suitable amphoteric surfactants for dish wash compositions are already mentioned above for laundry compositions.

Preferred amphoteric surfactants for dish wash compositions are selected from C8-C18 alkyl-dimethyl aminoxides and C8-C18 alkyl-di(hydroxyethyl)aminoxide.

The manual dish wash detergent composition of the invention preferably comprises from 1 wt % to 15 wt %, preferably from 2 wt % to 12 wt %, more preferably from 3 wt % to 10 wt % of the composition of an amphoteric surfactant, preferably an amine oxide surfactant. Preferably the composition of the invention comprises a mixture of the anionic surfactants and alkyl dimethyl amine oxides in a weight ratio of less than about 10:1, more preferably less than about 8:1, more preferably from about 5:1 to about 2:1.

Addition of the amphoteric surfactant provides good foaming properties in the dish wash composition.

Dish wash compositions according to the invention may comprise at least one zwitterionic surfactant.

Examples of suitable zwitterionic surfactants for dish wash compositions are already mentioned above for laundry compositions.

Preferred zwitterionic surfactants for dish wash compositions are selected from betaine surfactants, more preferable from Cocoamidopropylbetaine surfactants.

In a preferred embodiment of the present invention, the zwitterionic surfactant is Cocamidopropylbetaine.

The manual dish wash detergent composition of the invention optionally comprises from 1 wt % to 15 wt %, preferably from 2 wt % to 12 wt %, more preferably from 3 wt % to 10 wt % of the composition of a zwitterionic surfactant, preferably a betaine surfactant. Dish wash compositions according to the invention may comprise at least one cationic surfactant.

Examples of suitable cationic surfactants for dish wash compositions are already mentioned above for laundry compositions.

Cationic surfactants, when present in the composition, are present in an effective amount, more preferably from 0.1 wt % to 5 wt %, preferably 0.2 wt % to 2 wt % of the composition.

Dish wash compositions according to the invention may comprise at least one non-ionic surfactant.

Examples of suitable non-ionic surfactants for dish wash compositions are already mentioned above for laundry compositions.

Preferred non-ionic surfactants are the condensation products of Guerbet alcohols with from 2 to 18 moles, preferably 2 to 15, more preferably 5-12 of ethylene oxide per mole of alcohol. Other preferred non-ionic surfactants for use herein include fatty alcohol polyglycol ethers, alkylpolyglucosides and fatty acid glucamides.

The manual hand dish detergent composition of the present invention may comprise from 0.1 wt % to 10 wt %, preferably from 0.3 wt % to 5 wt %, more preferably from 0.4 wt % to 2 wt % of the composition, of a linear or branched C10 alkoxylated non-ionic surfactant having an average degree of alkoxylation of from 2 to 6, preferably from 3 to 5. Preferably, the linear or branched C10 alkoxylated non-ionic surfactant is a branched C10 ethoxylated non-ionic surfactant having an average degree of ethoxylation of from 2 to 6, preferably of from 3 to 5. Preferably, the composition comprises from 60 wt % to 100 wt %, preferably from 80 wt % to 100 wt %, more preferably 100 wt % of the total linear or branched C10 alkoxylated non-ionic surfactant of the branched C10 ethoxylated non-ionic surfactant. The linear or branched C10 alkoxylated non-ionic surfactant preferably is a 2-propylheptyl ethoxylated non-ionic surfactant having an average degree of ethoxylation of from 3 to 5. A suitable 2-propylheptyl ethoxylated non-ionic surfactant having an average degree of ethoxylation of 4 is Lutensol®XP40, commercially available from BASF SE, Ludwigshafen, Germany. The use of a 2-propylheptyl ethoxylated non-ionic surfactant having an average degree of ethoxylation of from 3 to 5 leads to improved foam levels and long-lasting suds.

Thus, one aspect of the present invention is a manual dish wash detergent composition, in particular a liquid manual dish wash detergent composition, comprising (i) at least one inventive polymer, and (ii) at least one further 2-propylheptyl ethoxylated non-ionic surfactant having an average degree of ethoxylation of from 3 to 5.

Dish wash compositions according to the invention may comprise at least one hydrotrope in an effective amount, to ensure the compatibility of the liquid manual dish wash detergent compositions with water.

Suitable hydrotropes for use herein include anionic hydrotropes, particularly sodium, potassium, and ammonium xylene sulfonate, sodium, potassium and ammonium toluene sulfonate, sodium, potassium, and ammonium cumene sulfonate, and mixtures thereof, and related compounds, as disclosed in U.S. Pat. No. 3,915,903.

The liquid manual dish wash detergent compositions of the present invention typically comprise from 0.1 wt % to 15 wt % of the total liquid detergent composition of a hydrotrope, or mixtures thereof, preferably from 1 wt % to 10 wt %, most preferably from 2 wt % to 5 wt % of the total liquid manual dish wash composition.

Dish wash compositions according to the invention may comprise at least one organic solvent.

Examples of organic solvents are C4-C14 ethers and diethers, glycols, alkoxylated glycols, C6-C16 glycol ethers, alkoxylated aromatic alcohols, aromatic alcohols, aliphatic branched alcohols, alkoxylated aliphatic branched alcohols, alkoxylated linear C1-C5 alcohols, linear C1-C5 alcohols, amines, C8-C14 alkyl and cycloalkyl hydrocarbons and halohydrocarbons, and mixtures thereof.

When present, the liquid dish wash compositions will contain from 0.01 wt % to 20 wt %, preferably from 0.5 wt % to 15 wt %, more preferably from 1 wt % to 10 wt %, most preferably from 1 wt % to 5 wt % of the liquid detergent composition of a solvent. These solvents may be used in conjunction with an aqueous liquid carrier, such as water, or they may be used without any aqueous liquid carrier being present. At higher solvent systems, the absolute values of the viscosity may drop but there is a local maximum point in the viscosity profile.

The dish wash compositions herein may further comprise from 30 wt % to 90 wt % of an aqueous liquid carrier, comprising water, in which the other essential and optional ingredients are dissolved, dispersed or suspended. More preferably the compositions of the present invention comprise from 45 wt % to 85 wt %, even more preferably from 60 wt % to 80 wt % of the aqueous liquid carrier. The aqueous liquid carrier, however, may contain other materials which are liquid, or which dissolve in the liquid carrier, at room temperature (25° C.) and which may also serve some other function besides that of an inert filler.

Dish wash compositions according to the invention may comprise at least one electrolyte.

Suitable electrolytes are preferably selected from inorganic salts, even more preferably selected from monovalent salts, most preferably sodium chloride.

The liquid manual dish wash compositions according to the invention may comprise from 0.1 wt % to 5 wt %, preferably from 0.2 wt % to 2 wt % of the composition of an electrolyte.

Manual dish wash formulations comprising the inventive polymer may also comprise at least one antimicrobial agent.

Examples of suitable antimicrobial agents for dish wash compositions are already mentioned above for laundry compositions.

The antimicrobial agent may be added to the inventive hand dish wash composition in a concentration of 0.0001 wt % to 10 wt % relative to the total weight of composition. Preferably, the formulation contains 2-phenoxyethanol in a concentration of 0.01 wt % to 5 wt %, more preferably 0.1 wt % to 2 wt % and/or 4,4'-dichloro 2-hydroxydiphenyl ether in a concentration of 0.001 wt % to 1 wt %, more preferably 0.002 wt % to 0.6 wt % (in all cases relative to the total weight of the composition).

Further additional ingredients are such as but not limited to conditioning polymers, cleaning polymers, surface modifying polymers, soil flocculating polymers, rheology modifying polymers, enzymes, structurants, builders, chelating agents, cyclic diamines, structurants, emollients, humectants, skin rejuvenating actives, carboxylic acids, scrubbing particles, bleach and bleach activators, perfumes, malodor control agents, pigments, dyes, opacifiers, beads, pearlescent particles, microcapsules, antibacterial agents, pH adjusters including NaOH and alkanolamines such as monoethanolamines and buffering means.

(c) General Cleaning Compositions and Formulations

In a preferred embodiment the polymer according to the present invention is used in a laundry detergent.

Liquid laundry detergents according to the present invention are composed of:

0.05-20% of at least one inventive polymer
1-50% of surfactants
0.1-40% of builders, cobuilders and/or chelating agents
0.1-50% other adjuncts
water to add up 100%.

Preferred liquid laundry detergents according to the present invention are composed of:

0.2-6% of at least one inventive polymer
5-40% of anionic surfactants selected from C10-C15-LAS and C10-C18 alkyl ethersulfates containing 1-5 ethoxy-units
1.5-10% of nonioic surfactants selected from C10-C18-alkyl ethoxylates containing 3-10 ethoxy-units
2-20% of soluble organic builders/cobuilders selected from C10-C18 fatty acids, di- and tricarboxylic acids, hydroxy-di- and hydroxytricaboxylic acids and polycarboxylic acids
0.05-5% of an enzyme system containing at least one enzyme suitable for detergent use and preferably also an enzyme stabilizing system
0.5-20% of mono- or diols selected from ethanol, isopropanol, ethylenglycol, or propylenglyclol
0.1-20% other adjuncts
water to add up to 100%.

Solid laundry detergents (like e.g. powders, granules or tablets) according to the present invention are composed of:

0.05-20% of at least one inventive polymer
1-50% of surfactants
0.1-80% of builders, cobuilders and/or chelating agents
0-50% fillers
0-40% bleach actives
0.1-30% other adjuncts and/or water
wherein the sum of the ingredients adds up 100%.

Preferred solid laundry detergents according to the present invention are composed of:

0.2-6% of at least one inventive polymer
5-30% of anionic surfactants selected from C10-C15-LAS, C10-C18 alkylsulfates and C10-C18 alkyl ethersulfates containing 1-5 ethoxy-units
1.5-7.5% of non-ionic surfactants selected from C10-C18-alkyl ethoxylates containing 3-10 ethoxy-units
5-50% of inorganic builders selected from sodium carbonate, sodiumbicarbonate, zeolites, soluble silicates, sodium sulfate
0.5-15% of cobuilders selected from C10-C18 fatty acids, di- and tricarboxylic acids, hydroxydi- and hydroxytricarboxylic acids and polycarboxylic acids
0.1-5% of an enzyme system containing at least one enzyme suitable for detergent use and preferably also an enzyme stabilizing system
0.5-20% of mono- or diols selected from ethanol, isopropanol, ethylenglycol, or propylenglyclol
0.1-20% other adjuncts
water to ad up to 100%

In a preferred embodiment the polymer according to the present invention is used in a manual dish wash detergent.

Liquid manual dish wash detergents according to the present invention are composed of:

0.05-10% of at least one inventive polymer
1-50% of surfactants
0.1-50% of other adjuncts
water to add up 100%.

Preferred liquid manual dish wash detergents according to the present invention are composed of:

0.2-5% of at least one inventive polymer
5-40% of anionic surfactants selected from C10-C15-LAS, C10-C18 alkyl ethersulfates containing 1-5 ethoxy-units, and C10-C18 alkylsulfate
2 10% of Cocamidopropylbetaine
0-10% of Lauramine oxide
0-2% of a non-ionic surfactant, preferably a C10-Guerbet alcohol alkoxylate
0-5% of an enzyme, preferably Amylase, and preferably also an enzyme stabilizing system
0.5-20% of mono- or diols selected from ethanol, isopropanol, ethylenglycol, or propylenglyclol
0.1-20% other adjuncts
water to add up to 100%

The following table shows general cleaning compositions of certain types, which correspond to typical compositions correlating with typical washing conditions as typically employed in various regions and countries of the world. The at least one inventive polymer may be added to such formulation(s) in suitable amounts as outlined herein.

TABLE 1

General formula for laundry detergent compositions according to the invention:

| Ingredient | Ranges of Ingredient in Liquid frame formulations |
|---|---|
| Linear alkyl benzene sulphonic acid | 0 to 30% |
| Coco fatty acid | 1 to 12% |
| Fatty alcohol ether sulphate | 0 to 25% |
| NaOH or mono or triethanol amine | Up to pH 7.5 to 9.0 |
| Alcohol ethoxylate | 3 to 10% |
| 1,2-Propylene glycol | 1 to 10% |
| Ethanol | 0 to 4% |
| Sodium citrate | 0 to 8% |
| water | Up to 100% |

TABLE 2

| Liquid laundry frame formulations according to the invention: | | | | | | |
|---|---|---|---|---|---|---|
| | (numbers: % active) | | | | | |
| active | F1 | F2 | F3 | F4 | F5 | F6 |
| alcohol ethoxylat 7EO | 5.40 | 10.80 | 12.40 | 7.30 | 1.60 | 7.60 |
| Coco fatty acid K12-18 | 2.40 | 3.10 | 3.20 | 3.20 | 3.50 | 6.40 |
| Fatty alcohol ether sulphate | 5.40 | 8.80 | 7.10 | 7.10 | 5.40 | 14.00 |
| Linear alkyl benzene sulphonic acid | 5.50 | 0.00 | 14.50 | 15.50 | 10.70 | 0.00 |
| 1,2 Propandiol | 6.00 | 3.50 | 8.70 | 8.70 | 1.10 | 7.80 |
| Triethanolamine | | | | | | |
| Monoethanolamine | | | 4.00 | 4.30 | 0.30 | |
| NaOH | 2.20 | 1.10 | | | | 1.00 |
| Glycerol | | 0.80 | 3.00 | 2.80 | | |
| Ethanol | 2.00 | | | | 0.38 | 0.39 |
| Na citrate | 3.00 | 2.80 | 3.40 | 2.10 | 7.40 | 5.40 |
| Inventive Polymer (s) (total) | 0-5 | 0-5 | 0-5 | 0-5 | 0-5 | 0-5 |
| Protease | 0-1 | 0-1 | 0-1 | 0-1 | 0-1 | 0-1 |
| Amylase | 0-0.5 | 0-0.5 | 0-0.5 | 0-0.5 | 0-0.5 | 0-0.5 |
| Cellulase | 0-0.3 | 0-0.3 | 0-0.3 | 0-0.3 | 0-0.3 | 0-0.3 |
| Lipase | 0-0.2 | 0-0.2 | 0-0.2 | 0-0.2 | 0-0.2 | 0-0.2 |
| Mannanase | 0-0.2 | 0-0.2 | 0-0.2 | 0-0.2 | 0-0.2 | 0-0.2 |
| Pectat Lyase | 0-0.3 | 0-0.3 | 0-0.3 | 0-0.3 | 0-0.3 | 0-0.3 |
| water | to 100 | to 100 | to 100 | to 100 | to 100 | to 100 |

| | (numbers: % active) | | | | | | | |
|---|---|---|---|---|---|---|---|---|
| active | F7 | F8 | F9 | F10 | F11 | F12 | F13 | F14 |
| alcohol ethoxylat 7EO | 3.80 | 0.30 | 13.30 | 8.00 | 5.70 | 20.00 | 9.20 | 29.00 |
| Coco fatty acid K12-18 | 2.80 | 3.00 | 1.70 | 1.80 | 2.50 | 5.00 | 8.60 | 10.40 |
| Fatty alcohol ether sulphate | 2.80 | 4.50 | 3.90 | 4.10 | | 10.00 | 22.20 | |
| Linear alkyl benzene sulphonic acid | 6.30 | 5.43 | 11.45 | 5.90 | 10.10 | 10.00 | 28.00 | 27.00 |
| 1,2 Propandiol | 0.50 | | 2.50 | 0.40 | 6.00 | 10.00 | 7.00 | 7.00 |
| Triethanolamine | | | | 8.10 | | | | |
| Monoethanolamine | 0.40 | 1.80 | | | | | 8.00 | 7.00 |
| NaOH | | | 2.20 | | 3.30 | 1.50 | | |
| Glycerol | | 0.60 | 0.20 | 1.90 | | | 7.00 | 10.00 |
| Ethanol | | | 1.84 | | | | | |
| Na citrate | 4.60 | 3.30 | 3.30 | 1.40 | | 1.50 | | |
| Inventive Polymer (s) (total) | 0-5 | 0-5 | 0-5 | 0-5 | 0-5 | 0-5 | 0-5 | 0-5 |
| Protease | 0-1 | 0-1 | 0-1 | 0-1 | 0-1 | 0-3 | 0-3 | 0-3 |
| Amylase | 0-0.5 | 0-0.5 | 0-0.5 | 0-0.5 | 0-0.5 | 0-0.5 | 0-0.5 | 0-0.5 |
| Cellulase | 0-0.3 | 0-0.3 | 0-0.3 | 0-0.3 | 0-0.3 | 0-0.3 | 0-0.3 | 0-0.3 |
| Lipase | 0-0.2 | 0-0.2 | 0-0.2 | 0-0.2 | 0-0.2 | 0-0.2 | 0-0.2 | 0-0.2 |
| Mannanase | 0-0.2 | 0-0.2 | 0-0.2 | 0-0.2 | 0-0.2 | 0-0.2 | 0-0.2 | 0-0.2 |
| Pectat Lyase | 0-0.3 | 0-0.3 | 0-0.3 | 0-0.3 | 0-0.3 | 0-0.3 | 0-0.3 | 0-0.3 |
| water | to 100 | to 100 | to 100 | to 100 | to 100 | to 100 | to 100 | to 100 |

TABLE 3

| Laundry powder frame formulations according to the invention: | | | | | | |
|---|---|---|---|---|---|---|
| | Bleach free Powder | | | | | |
| Alcohol ethoxylate 7EO | 0.6 | 0 | 1 | 0 | 0 | 5.2 |
| Coco fatty acid K12-18 | 1.2 | 0 | 0 | 0 | 0 | 0 |
| Fatty alcohol ether sulphate | 1.5 | 0 | 0 | 0 | 0 | 6 |
| Linear alkyl benzene sulphonic acid | 12.1 | 11.2 | 13.6 | 21.9 | 18.7 | 12.7 |
| Bleach activator | 0 | 0 | 0 | 0 | 0 | 0 |
| Percarbonate | 0 | 0 | 0 | 0 | 0 | 0 |
| AcetateNa | 0 | 0 | 0 | 0.1 | 0 | 0.1 |
| CitrateNa | 0 | 0 | 0 | 0 | 0 | 14 |
| Na Silicate | 27.9 | 5.8 | 6.6 | 2 | 15 | 20.3 |
| Na Carbonate | 17.2 | 35 | 37.3 | 30.1 | 37 | 1 |
| Na Phospahte | 0 | 0 | 0 | 14 | 0.3 | 0 |
| Na Hydrogencarbonate | 0.7 | 0.9 | 0.5 | 2.7 | 0.4 | 10.5 |
| Zeolite4A | 4.2 | 0.1 | 5.1 | 10.2 | 1.8 | 11.6 |

TABLE 3-continued

| Laundry powder frame formulations according to the invention: | | | | | | |
|---|---|---|---|---|---|---|
| HEDP | 0 | 0 | 0 | 0 | 0 | 0.13 |
| MGDA | 0 | 1.1 | 0 | 0 | 0 | 0 |
| Cellulase | 0-0.5 | 0-0.5 | 0-0.5 | 0-0.5 | 0-0.5 | 0-0.5 |
| Lipase | 0-0.4 | 0-0.4 | 0-0.4 | 0-0.4 | 0-0.4 | 0-0.4 |
| Mannanase | 0-0.4 | 0-0.4 | 0-0.4 | 0-0.4 | 0-0.4 | 0-0.4 |
| Protease | 0-1.5 | 0-1.5 | 0-1.5 | 0-1.5 | 0-1.5 | 0-1.5 |
| Amylase | 0-0.5 | 0-0.5 | 0-0.5 | 0-0.5 | 0-0.5 | 0-0.5 |
| Na Sulfate | 30.8 | 1.3 | 33 | 11 | 22 | 3 |
| Na Chloride | 0.2 | 43 | 0.1 | 0 | 0.1 | 0.1 |
| optical brightener | 0.02 | 0 | | 0.1 | 0.06 | |
| Inventive Polymer(s) (total) | 1 | 0 | 0.2 | 2 | 0.5 | 3 |
| | Bleach containing Powder | | | | | |
| Alcohol ethoxylate 7EO | 1.2 | 5 | 4 | 0.5 | 0.5 | 0 |
| Coco fatty acid K12-18 | 0 | 0 | 0 | 0.3 | 0 | 0.6 |
| Fatty alcohol ether sulphate | 0 | 3.9 | 4.4 | 1.6 | 0 | 0 |

TABLE 3-continued

| Laundry powder frame formulations according to the invention: | | | | | | |
|---|---|---|---|---|---|---|
| Linear alkyl benzene sulphonic acid | 7.6 | 12.1 | 11.5 | 12.2 | 6.5 | 10.4 |
| Bleach activator | 0.2 | 9.5 | 9.5 | 0.5 | 0.8 | 2.2 |
| Percarbonate | 3.6 | 19.4 | 16.6 | 2.2 | 11.5 | 5.8 |
| AcetateNa | 0 | 6.7 | 7.1 | 0.3 | 1 | 0.7 |
| CitrateNa | 0 | 1.6 | 8.2 | 0.3 | 0.9 | 1.7 |
| Na Silicate | 3.6 | 11.3 | 16.4 | 10.2 | 9.1 | 16.5 |
| Na Carbonate | 21.6 | 8.7 | 1.4 | 8 | 22.9 | 14.8 |
| Na Phospahte | 0 | 0 | 0 | 0 | 0 | 0 |
| Na Hydrogencarbonate | 0.2 | 2.8 | 1.6 | 0.8 | 0.5 | 0.5 |
| Zeolite4A | 1.6 | 1.4 | 2.4 | 1.6 | 1.8 | 2.3 |
| HEDP | 0 | 0.27 | 0.16 | 0 | 0 | 0.17 |
| MGDA | 0 | 0 | 0 | 0 | 0 | 0 |
| Cellulase | 0-0.5 | 0-0.5 | 0-0.5 | 0-0.5 | 0-0.5 | 0-0.5 |
| Lipase | 0-0.4 | 0-0.4 | 0-0.4 | 0-0.4 | 0-0.4 | 0-0.4 |
| Mannanase | 0-0.4 | 0-0.4 | 0-0.4 | 0-0.4 | 0-0.4 | 0-0.4 |
| Protease | 0-1.5 | 0-1.5 | 0-1.5 | 0-1.5 | 0-1.5 | 0-1.5 |
| Amylase | 0-0.5 | 0-0.5 | 0-0.5 | 0-0.5 | 0-0.5 | 0-0.5 |
| Na Sulfate | 51 | 4 | 6 | 57 | 38 | 37 |
| Na Chloride | 1 | 1 | 0.5 | 1.2 | 0.2 | 1 |
| optical brightener | | 0.29 | 0.1 | 0.23 | 0.13 | 0.19 |
| Inventive Polymer(s) (total) | 2.2 | 9.2 | 2.2 | 0.7 | | 0.4 |

TABLE 4

| Liquid manual dish wash frame formulations according to the invention: | | | | | | | | |
|---|---|---|---|---|---|---|---|---|
| Ingredients | MDW.1 | MDW.2 | MDW.3 | MDW.4 | MDW.5 | MDW.6 | MDW.7 | MDW.8 |
| Linear C12-C14-alkyl-benzenesulfonic acid | 8 | 0 | 6 | 0 | 6 | 0 | 6 | 0 |
| C12-C14-fatty alcohol x 2 EO sulfate | 8 | 16 | 6 | 12 | 6 | 12 | 6 | 12 |
| Cocamidopropyl betaine | 0 | 0 | 4 | 4 | 0 | 0 | 2 | 2 |
| Lauramine oxide | 0 | 0 | 0 | 0 | 4 | 4 | 2 | 2 |
| 2-Propylheptanol x 4 EO | 0.5 | 0.5 | 0.5 | 0.5 | 0.5 | 0.5 | 0.5 | 0.5 |
| Inventive Polymer (s) (total) | 1 | 1 | 1 | 1 | 1 | 1 | 1 | 1 |
| Ethanol | 2 | 2 | 2 | 2 | 2 | 2 | 2 | 2 |
| 2-Phenoxyethanol (preservative) | 1 | 1 | 1 | 1 | 1 | 1 | 1 | 1 |
| Sodium chloride | 1 | 1 | 1 | 1 | 1 | 1 | 1 | 1 |
| Demin. water | add 100 | add 100 | add 100 | add 100 | add 100 | add 100 | add 100 | add 100 |
| Sodium hydroxide | add pH 8 | add pH 8 | add pH 8 | add pH 8 | add pH 8 | add pH 8 | add pH 8 | add pH 8 |

The following examples shall further illustrate the present invention without restricting the scope of the invention.

The amount and type of amines substituted with residues such as, for example, those according to formula (IIa) and/or optionally the presence of hydrogen can be determined by identification of primary, secondary and tertiary amino groups in $^{13}$C-NMR, as described for polyethylene imines in Lukovkin G. M., Pshezhetsky V. S., Murtazaeva G. A.: *Europ. Polymer Journal* 1973, 9, 559-565 and St. Pierre T., Geckle M.: *ACS Polym. Prep.* 1981, 22, 128-129.

$^{13}$C-NMR spectra are recorded in $CDCl_3$ with a Bruker AV-401 instrument at room temperature. $^{1}$H-NMR spectra are recorded in $CDCl_3$ or $CD_3OD$ with a Bruker AV-401 instrument at room temperature.

Saponification values are measured according to DIN EN ISO 3657: 2013.

SYNTHESIS EXAMPLES

In all the examples, step b) is begun after step a) is ended, step c) is begun after step b) is ended and step d) is begun after step c) is ended.

1) Synthesis of Compounds According to the Present Invention

Example 1: (PEI 800+0.9 PO/NH+0.9 CL/NH+20 EO/NH)+4 EO/NH+16 PO/NH

Example 1a: PEI 800+0.9 PO/NH 302 g of PEI 800 and 30.2 g water are charged to a steel pressure reactor. The reactor is purged with nitrogen to remove air and a nitrogen pressure of 2 bar is set. The reactor is heated to 100° C. and 368 g of propylene oxide are dosed into the reactor within 14 hours. After that, the reaction mixture is kept at 100° C. for post reaction. Volatile compounds are removed under vacuum and 668 g of a yellow and highly viscous product is removed from the reactor.

Example 1b: (PEI 800+0.9 PO/NH)+0.9 CL/NH 90 g of the previously obtained product are charged into a four-necked round bottom flask equipped with a cooler and a dripping funnel under nitrogen atmosphere. The reaction mixture is heated to 80° C. and 97 g of caprolactone are added slowly at 80° C. After caprolactone addition, the temperature is increased slowly to 120° C. and the mixture is allowed to post-react for 24 hours at 120° C. 182 g of a brownish, highly viscous liquid were obtained.

Example 1c: (PEI 800+0.9 PO/NH+0.9 CL/NH)+20 EO/NH 153 g of the previously obtained product are filled into a steel pressure reactor and 5.0 g of potassium methanolate (32.5 wt % in methanol) are added. Methanol is removed at mbars at 80° C. The reactor is purged with nitrogen to remove air and a nitrogen pressure of 1.5 bars is set. The reactor is heated to 120° C. and 682 g of ethylene oxide are dosed into the reactor within 12 hours. The mixture is allowed to post react for seven hours at 120° C. 790 g of a light brown solid were obtained as product.

Example 1d: (PEI 800+0.9 PO/NH+0.9 CL/NH+20 EO/NH)+4 EO/NH+16 PO/NH 380 g of the previously obtained ethoxylate are filled into a steel pressure reactor and 2.5 g of potassium methanolate (32.5 wt % in methanol) are added. Methanol is removed at 20 mbars at 110° C. The reactor is purged with nitrogen to remove air and a nitrogen pressure of 1 bars is set. The reactor is heated to 130° C. and 62 g of ethylene oxide are dosed into the reactor within one hour. The mixture is allowed to post react for two hours at 130° C. Subsequently, 327 g of propylene oxide are dosed into the reactor at 130° C. within six hours. The mixture is allowed to post-react for six hours at 130° C. 778 g of an orange viscous liquid were obtained as product.

Example 2: (PEI 800+0.9 PO/NH+1.8 CL/NH+20 EO/NH)+4 EO/NH+16 PO/NH

Example 2a: PEI 800+0.9 PO/NH 302 g of PEI 800 and 30.2 g water are charged to a steel pressure reactor. The reactor is purged with nitrogen to remove air and a nitrogen pressure of 2 bar is set. The reactor is heated to 100° C. and 368 g of propylene oxide are dosed into the reactor within 14 hours. After that, the reaction mixture is kept at 100° C. for post reaction. Volatile compounds are removed under vacuum and 668 g of a yellow and highly viscous product is removed from the reactor.

Example 2b: (PEI 800+0.9 PO/NH)+1.8 CL/NH 70 g of the previously obtained product are charged into a four-necked round bottom flask equipped with a cooler and a dripping funnel under nitrogen atmosphere. 2.9 g of tin-II $(ethylhexanoate)_2$ (1 mol %) are charged to the reactor. The reaction mixture is heated to 80° C. and 169 g of caprolactone are added slowly at 80° C. After caprolactone addition, the temperature is increased slowly to 120° C. and the mixture is allowed to post-react four hours at 120° C. 236 g of an orange, highly viscous liquid were obtained.

Example 2c: (PEI 800+0.9 PO/NH+1.8 CL/NH)+20 EO/NH 105 g of the previously obtained product are filled into a steel pressure reactor and 2.5 g of potassium methanolate (32.5 wt % in methanol) are added. Methanol is removed at 20 mbars at 80° C. The reactor is purged with nitrogen to remove air and a nitrogen pressure of 1.5 bars is set. The reactor is heated to 120° C. and 308 g of ethylene oxide are dosed into the reactor within six hours. The mixture is allowed to post react for 12 hours at 120° C. 406 g of a light brown solid were obtained as product.

Example 2d: (PEI 800+0.9 PO/NH+1.8 CL/NH+20 EO/NH)+4 EO/NH+16 PO/NH 140 g of the previously obtained ethoxylate are filled into a steel pressure reactor and 0.8 g of potassium methanolate (32.5 wt % in methanol) are added. Methanol is removed at 20 mbars at 110° C. The reactor is purged with nitrogen to remove air and a nitrogen pressure of 3 bars is set. The reactor is heated to 130° C. and 21 g of ethylene oxide are dosed into the reactor ten minutes. The mixture is allowed to post react for two hours at 130° C. Subsequently, 110 g of propylene oxide are dosed into the reactor at 130° C. within two hours. The mixture is allowed to post-react for five hours at 130° C. 262 g of an orange viscous liquid were obtained as product.

Example 3: (PEI 800+0.92 EO/NH+0.92 CL/NH+20 EO/NH)+4 EO/NH+16 PO/NH

Example 3a: PEI 800+0.92 EO/NH 800 g of PEI 800 and 80 g water are charged to a steel pressure reactor. The reactor is purged with nitrogen to remove air and a nitrogen pressure of 2 bar is set. The reactor is heated to 100° C. and 755 g of ethylene oxide are dosed into the reactor within 13 hours. After that, the reaction mixture is kept at 100° C. for post reaction for six hours. Volatile compounds are removed under vacuum and 1550 g of a yellow and highly viscous product is removed from the reactor.

Example 3b: (PEI 800+0.92 EO/NH)+0.92 CL/NH 150 g of the previously obtained product are charged into a four-necked round bottom flask equipped with a cooler and a dripping funnel under nitrogen atmosphere. 0.36 g of tin-II $(ethylhexanoate)_2$ are charged to the reactor. The reaction mixture is heated to 80° C. and 207 g of caprolactone are added slowly at 80° C. After caprolactone addition, the temperature is slowly increased to 160° C. and the mixture is allowed to post-react at 160° C. over-night. 345 g of a brown, highly viscous liquid were obtained.

Example 3c: (PEI 800+0.92 EO/NH+0.92 CL/NH)+20 EO/NH 150 g of the previously obtained ethoxylate are filled into a steel pressure reactor and 1.64 g of potassium tert-butoxide are added. The reactor is purged with nitrogen to remove air and a nitrogen pressure of 2.5 bars is set. The reactor is heated to 120° C. and 669 g of ethylene oxide are dosed into the reactor within ten hours. The mixture is allowed to post react for 12 hours at 120° C. 821 g of a light brown solid were obtained as product.

Example 3d: (PEI 800+0.92 EO/NH+0.92 CL/NH+20 EO/NH)+4 EO/NH+16 PO/NH 380 g of the previously obtained ethoxylate are filled into a steel pressure reactor and 3.3 g of potassium methanolate (32.5 wt % in methanol) are added. Methanol is removed at 20 mbars at 110° C. The reactor is purged with nitrogen to remove air and a nitrogen pressure of 1 bar is set. The reactor is heated to 130° C. and 62 g of ethylene oxide are dosed into the reactor thirty minutes. The mixture is allowed to post react for two hours at 130° C. Subsequently, 327 g of propylene oxide are dosed into the reactor at 130° C. within six hours. The mixture is allowed to post-react for five hours at 130° C. 770 g of an orange viscous liquid were obtained as product.

Example 4: (PEI 800+1.1 BuO/NH+1.1 CL/NH+27 EO/NH)+18 PO/NH

Example 4a: PEI 800+1.1 BuO/NH 250 g of PEI 800 and 25 g water are charged to a steel pressure reactor. The reactor is purged with nitrogen to remove air and a nitrogen pressure of 1.5 bar is set. The reactor is heated to 100° C. and 461 g of butylene oxide are dosed into the reactor within 14 hours. After that, the reaction mixture is kept at 100° C. for post reaction. Volatile compounds are removed under vacuum and 702 g of a light yellow and highly viscous product is removed from the reactor.

Example 4b: (PEI 800+1.1 BuO/NH)+1.1 CL/NH 180 g of the previously obtained product are charged into a four-necked round bottom flask equipped with a cooler and a dripping funnel under nitrogen atmosphere. The product is heated to 80° C. and 190 g of caprolactone are added slowly at 80° C. After caprolactone addition, the temperature is increased slowly to 160° C. and the mixture is allowed to post-react thirty hours at 160° C. 360 g of a light brown, slightly viscous liquid were obtained.

Example 4c: (PEI 800+1.1 BuO/NH+1.1 CL/NH)+27 EO/NH+18 PO/NH 100 g of the previously obtained product are filled into a steel pressure reactor and 6.2 g of potassium methanolate (32.5 wt % in methanol) are added. Methanol is removed at 20 mbar at 90° C. The reactor is purged with nitrogen to remove air and a nitrogen pressure of 2 bar is set. The reactor is heated to 130° C. and 481 g of ethylene oxide are dosed into the reactor within ten hours. The mixture is allowed to post react for 6 hours at 130° C. Subsequently, 423 g of propylene oxide are dosed into the reactor within eight hours. The mixture is allowed to post react for 6 hours at 130° C. After evaporation of residual alkylene oxides, 1002 g of a dark orange highly viscous liquid were obtained as product.

2) Comparative Examples

Comparative Example 1: PEI 600, Ethoxylated and Propoxylated (24 EO-16 PO)

This example is prepared as described in WO 95/32272 by a two-step alkoxylation.

3 Application Experiments

Primary Cleaning Performance on Oily/Fatty Stains

To determine the primary detergency, the cleaning performance on 16 different oily/fatty stains on cotton, polycotton and polyester fabrics (CFT, Vlaardingen, The Netherlands) was measured by determining the color difference (delta E) between the stains after wash and the unsoiled white fabric using a reflectometer (Datacolor SF600 plus). Each experiment containing the 16 different circular oily/fatty stains (Lipstick, Make-Up, Beef Fat, Frying Fat, Burnt Butter, Palm Oil, Sebum BEY, Sebum Tefo, Collar Stain; All on different fabrics) was repeated 6 times, and the obtained data was used to calculate the average delta E value.

By using these delta E values, the so-called "standardized cleaning performance" (delta delta E) has been calculated for each individual stain. The "standardized cleaning performance" (delta delta E) is the difference of the performance of the laundry detergent including the inventive amphiphilic alkoxylated polyalkylene imine or alkoxylated polyamine or comparative polymer, respectively, vs. the laundry detergent w/o any inventive amphiphilic alkoxylated polyalkylene imine or alkoxylated polyamine or comparative polymer, respectively.

Table 5 shows the composition of the laundry detergent, Table 6 shows the washing test conditions and Table 7 summarizes the obtained standardized cleaning performance. The standardized cleaning performance shown in Table 7 is the sum of the standardized cleaning performance of all 16 stains. The bigger the sum of the delta delta E value, the bigger the positive contribution of the inventive amphiphilic alkoxylated polyalkylene imine or alkoxylated polyamine or comparative polymer, respectively, on the cleaning performance.

TABLE 5

Composition of the liquid laundry detergent.

| Ingredients | LLD.1 * |
|---|---|
| Linear $C_{12}C_{14}$-alkylbenzenesulfonic acid | 5.50 |
| $C_{12}$-fatty alcohol × 2 EO sulfate | 5.40 |
| $C_{12}C_{15}$-fatty alcohol × 7 EO | 5.40 |
| Coconut C12-C18 fatty acid | 2.40 |
| Sodium hydroxide | 2.20 |
| 1,2-Propylene glycol | 6.00 |
| Ethanol | 2.00 |
| Sodium citrate | 3.00 |
| Demin. water | add 100 |
| pH value | 8.5 |

* All data are wt % active ingredient, independent of the respective product form.

TABLE 6

Washing conditions for evaluation of primary cleaning performance on oily/fatty stains. Washing conditions

| | |
|---|---|
| Device | Launder-O-Meter from SDL Atlas, Rock Hill, USA |
| Washing liquor | 250 mL |
| Washing time | 60 minutes |
| Washing temperature | 30° C. |
| Detergent concentration | 3.0 g/L |
| Water hardness (Ca:Mg:HCO3) | 2.5 mmol/L (4:1:8) (14°dH) |
| Fabric to liquor ratio | 1:10 |
| Amphiphilic alkoxylated polyalkylene imine or alkoxylated polyamine | 2.83% by weight (vs. liquid laundry detergent) of the polymer, 100% active ingredient |
| Test fabric * | 16 different circular oily/fatty stains (KC-H122, KC-H176, KC-H015, KC-H187, PC-H082, PC-H212, PC-H210, PC-H252, P-H122, P-H129, P-H015, P-H187, P-H082, P-H212, P-H210, P-H252) (CFT, Vlaardingen, The Netherlands) |
| Ballast fabric | Polyester and cotton ballast, to yield a 1:1 ratio of polyester/cotton fabric per experiment |

* After the washing experiment, the test fabrics were rinsed with 14° dH water (2 times), followed by drying at ambient room temperature overnight, prior to the measurement with the reflectometer.

TABLE 7

Results from washing tests (primary cleaning performance on oily/fatty stains).

| Detergent | Example | Concentration of polymeric additive * | Standardized cleaning performance (sum delta delta E) |
|---|---|---|---|
| LLD.1 | #1 | 2.83 wt % | 51.6 |
| LLD.1 | #2 | 2.83 wt % | 42.7 |
| LLD.1 | #3 | 2.83 wt % | 10.8 |
| LLD.1 | #4 | 2.83 wt % | 47.2 |
| LLD.1 | Comparative example 1 | 2.83 wt % | 106.9 |

* All data are wt % active ingredient, independent of the respective product form.

Test Results:

The error of the measurement is +/−10 delta delta E units. Therefore, any value >10 (sum delta delta E) means that the respective polymer exhibits a directional and visible contribution to the overall cleaning performance of the respective detergent formulation; Any value >20 (sum delta delta E) means that the respective polymer exhibits even a significant contribution to the overall cleaning performance, i.e., the respective polymer leads to a significant improvement of the formulation.

Biodegradation Data:

Biodegradation in wastewater was tested in triplicate using the OECD 301F manometric respirometry method. OECD 301F is an aerobic test that measures biodegradation of a sample by measuring the consumption of oxygen. To a measured volume of medium, 100 mg/L test substance, which is the nominal sole source of carbon is added along with the inoculum (30 mg/L, aerated sludge taken from Mannheim wastewater treatment plant). This is stirred in a closed flask at a constant temperature (20° C.) for 28 days. The consumption of oxygen is determined by measuring the change in pressure in the apparatus using an OxiTop® C (Xylem 35 Analytics Germany Sales GmbH & Co KG). Evolved carbon dioxide is absorbed in a solution of sodium hydroxide. Nitrification inhibitors are added to the flask to prevent usage of oxygen due to nitrification. The amount of oxygen taken up by the microbial population during biodegradation of the test substance (corrected for uptake by blank inoculum, run in parallel) is expressed as a percentage of ThOD (Theoretical oxygen demand, which is measured by the elemental analysis of the compound). A positive control Glucose/Glucosamine is run along with the test samples for each cabinet.

TABLE 8

| Biodeg tests | |
|---|---|
| Example | Biodeg data |
| #1 | 39.4% |
| #2 | 54.8% |
| #3 | 79.9% |
| #4 | 45.4% |
| Comparative example 1 | 5.1% |

Test Results:

Only the inventive materials (polymers 1-4) exhibit significant biodegradation properties (>10%) in the OECD 301F test after 28 days. Therefore, only the inventive materials (polymers 1-4) show a good combination of cleaning performance (i.e., visible improvement of the formulation) and biodegradation.

The invention claimed is:

1. An alkoxylated polyalkylene imine or alkoxylated polyamine obtained by a process comprising the steps a) to d) as follows:

a) reaction of i) at least one polyalkylene imine or at least one polyamine with ii) at least one first alkylene oxide (AO1), wherein 0.25 to 7.0 mol of alkylene oxide (AO1) is employed per mol of NH-functionality of polyalkylene imine or of polyamine, in order to obtain a first intermediate (I1), b) reaction of the first intermediate (I1) with at least one lactone and/or at least one hydroxy carbon acid, wherein 0.25 to 10 mol of lactone and/or of hydroxy carbon acid is employed per mol of NH-functionality of polyalkylene imine or of polyamine as employed in step a), in order to obtain a second intermediate (I2), c) reaction of the second intermediate (I2) with ethylene oxide, wherein 1 to 100 mol of ethylene oxide is employed per mol of NH-functionality of polyalkylene imine or of polyamine as employed in step a), in order to obtain a third intermediate (I3), and d) reaction of the third intermediate (I3) with at least one second alkylene oxide (AO2), wherein at least 1 mol of alkylene oxide (AO2) is employed per mol of NH-functionality of polyalkylene imine or of polyamine as employed in step a), in order to obtain the alkoxylated polyalkylene imine or the alkoxylated polyamine, and wherein the second alkylene oxide (AO2) is different to ethylene oxide in case only one second alkylene oxide (AO2) is employed in step d).

wherein the polyamine is a linear or predominantly linear compound in respect of its backbone without consideration of any alkoxylation that contains primary or secondary amino moieties but no tertiary amino moieties within its backbone, wherein the polyalkylene imine is a branched or predominantly branched molecule in respect of its backbone without consideration of any alkoxylation that contains in addition to primary or secondary amino moieties mandatorily tertiary amino moieties wherein the alkoxylated polyalkylene imine or alkoxylated polyamine contains at least one residue according to general formula (IIa)

(IIa)

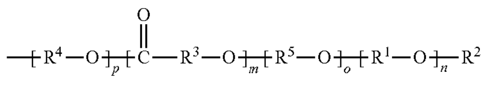

in which the variables are each defined as follows:

$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^4$ represents $C_2$-$C_{22}$-(1,2-alkylene) radicals;
$R^5$ represents 1,2-ethylene;
m is an integer having a value of at least 1 to 10;
n is an integer having a value of at least 5 to 100;
o is an integer having a value of at least 1 to 100; and
p is an integer having a value of at least 1 to 5;

wherein the alkoxylated polyalkylene imine or alkoxylated polyamine further contains at least one residue according to general formula (IIb)

(IIb)

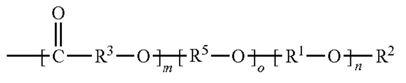

in which the variables are each defined as follows:

$R^1$ represents $C_2$-$C_{22}$-(1,2-alkylene) radicals;
$R^2$ represents hydrogen and/or $C_1$-$C_{22}$-alkyl and/or $C_7$-$C_{22}$-aralkyl;
$R^3$ represents linear or branched $C_1$-$C_{22}$-alkylene radicals;
$R^5$ represents 1,2-ethylene;
m is an integer having a value of at least 1 to 10;
n is an integer having a value of at least 5 to 100; and
o is an integer having a value of at least 1 to 100;

wherein the alkoxylated polyalkylene imine or alkoxylated polyamine further contains at least one residue according to general formula (IIc)

$$-\!\!\left[R^5-O\right]_o\!\!\left[R^1-O\right]_n\!\!-R^2 \qquad \text{(IIc)}$$

in which the variables are defined as follows:

$R^1$ represents $C_2$-$C_{22}$-(1,2-alkylene) radicals;

$R^2$ represents hydrogen or $C_1$-$C_{22}$-alkyl;

$R^5$ represents 1,2-ethylene;

n is an integer having a value of at least 5 to 100; and o is an integer having a value of at least 0 to 100;

wherein the residue (IIa) accounts for at least 80 wt.-% of all residues (IIa), (IIb) and (IIc) attached to the amino groups of the polyalkylene imine or polyamine as employed in step a).

2. The alkoxylated polyalkylene imine or alkoxylated polyamine according to claim 1, wherein the at least one polyalkylene imine or the at least one polyamine as employed in step a) is defined according to general formula (I)

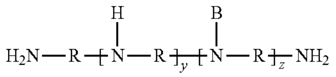

(I)

in which the variables are each defined as follows:

R represents identical or different, i) linear or branched $C_2$-$C_{12}$-alkylene radicals or ii) an etheralkyl unit of the following formula (III):

$$-R^{10}\!\left(O-R^{11}\right)_d\!O-R^{12}- \qquad \text{(III)}$$

in which the variables are each defined as follows:

$R^{10}$, $R^{11}$, $R^{12}$ represent identical or different, linear or branched $C_2$-$C_6$-alkylene radicals and d is an integer having a value in the range of 0 to 50 or iii) $C_5$-$C_{10}$ cycloalkylene radicals optionally substituted with at least one $C_1$-$C_3$ alkyl; and B represents a continuation of the polyalkylene imine by branching;

y and z are each an integer having a value in the range of 0 to 150.

3. The alkoxylated polyalkylene imine or alkoxylated polyamine according to claim 1, wherein i) step a) is carried out in the presence of water and/or in the presence of a base catalyst, and/or ii) the weight-average molecular weight (Mw) of the polyalkylene imine or of the polyamine employed in step a) lies in the range of 50 to 10 000 g/mol, and/or iii) at least two different alkylene oxides are employed as second alkylene oxide (AO2) in step d) in consecutive order, and/or iv) in step d) the second alkylene oxide (AO2) comprises >80% by weight of propylene oxide and/or 1,2-butylene oxide; and/or v) residues according to general formula (IIc) do not account for >50% of all residues on the alkoxylated polyalkylene imine or alkoxylated polyamine.

4. The alkoxylated polyalkylene imine according to claim 2, wherein the variables are each defined as follows:

R is ethylene and/or propylene; and the sum of y+z is an integer having a value in the range of 9 to 120.

5. The alkoxylated polyamine according to claim 2, wherein y is an integer having a value in the range of 0 to 10;

z is 0; and

R represents identical or different, linear or branched $C_2$-$C_{12}$-alkylene radicals or an etheralkyl unit according to formula (III), wherein d is from 1 to 5, and $R^{10}$, $R^{11}$, $R^{12}$ are independently selected from the group consisting of linear and branched $C_3$ to $C_4$ alkylene radicals.

6. The alkoxylated polyalkylene imine or alkoxylated polyamine according to claim 1, wherein up to 100% of the nitrogen atoms present in the alkoxylated polyalkylene imine or alkoxylated polyamine are quaternized.

7. The alkoxylated polyalkylene imine or alkoxylated polyamine according to claim 1, wherein i) in step b) the lactone is caprolactone, and/or ii) in step b) the hydroxy carbon acid is lactic acid or glycolic acid, and/or iii) in step a) the first alkylene oxide (AO1) is at least one $C_2$-$C_{22}$-epoxide, and/or iv) in step d) the second alkylene oxide (AO2) comprises propylene oxide, and/or v) in step d) the second alkylene oxide (AO2) comprises >80% by weight of propylene oxide and/or 1,2-butylene oxide.

8. The alkoxylated polyalkylene imine or alkoxylated polyamine according to claim 1, wherein i) in step a) 0.5 to 2 mol of alkylene oxide (AO1) is employed per mol of NH-functionality of polyalkylene imine or of polyamine, and/or ii) in step b) 0.5 to 3 mol of lactone and/or of hydroxy carbon acid is employed per mol of NH-functionality of polyalkylene imine or of polyamine as employed in step a), and/or iii) in step c) 10 to 50 mol of ethylene oxide is employed per mol of NH-functionality of polyalkylene imine or of polyamine as employed in step a), and/or iv) in step d) 10 to 50 mol of alkylene oxide (AO2) is employed per mol of NH-functionality of polyalkylene imine or of polyamine as employed in step a), and/or v) the alkyoxylated polyalkylene imine or alkoxylated polyamine is amphiphilic.

9. A method of using the alkoxylated polyalkylene imine or alkoxylated polyamine of claim 1, the method comprising using the alkoxylated polyalkylene imine or alkoxylated polyamine in cleaning compositions, in fabric and home care products, in cosmetic formulations, as crude oil emulsion breaker, in pigment dispersions for ink jet inks, in formulations for electro plating, in cementitious compositions and/or as dispersant for agrochemical formulations.

10. The method according to claim 9, wherein the method comprises using the alkoxylated polyalkylene imine or alkoxylated polyamine in cleaning compositions and/or in fabric and home care products.

11. A cleaning composition, fabric and home care product, cosmetic formulation, crude oil emulsion breaker, pigment dispersion for ink jet inks, formulation for electro plating, cementitious composition and/or dispersant for agrochemical formulations, comprising at least one alkoxylated polyalkylene imine or alkoxylated polyamine according to claim 1.

12. The cleaning composition according to claim 11, wherein the cleaning composition is a cleaning composition for i) clay removal, and/or ii) soil removal of particulate stains, and/or iii) dispersion and/or emulsification of soils, and/or iv) modification of treated surface to improve removal upon later re-soiling, and/or v) whiteness improvement and/or vi) when at least one enzyme selected from the group consisting of lipases, hydrolases, amylases, proteases, cellulases, hemicellulases, phospholipases, esterases, pectinases, lactases and peroxidases, and combinations of at least two of the foregoing enzymes, is present—additionally for improvement of oily/fatty stains, food stain removal and/or removal of complex stains, and/or vii) additionally comprising at least one enzyme selected from the group consisting of lipases, hydrolases, amylases, proteases, cellulases, hemicellulases, phospholipases, esterases, pectinases, lactases and peroxidases, and combinations of at least two of the foregoing enzymes, and/or viii) for oily/fatty stain removal, food stain removal and/or removal of complex stains, when at least one enzyme according to vii) is present.

13. The alkoxylated polyalkylene imine or alkoxylated polyamine according to claim 2, wherein R represents identical or different, i) linear or branched $C_2$-$C_{12}$-alkylene radicals, or ii) $C_5$-$C_{10}$-cycloalkylene radicals optionally substituted with at least one $C_1$-$C_3$-alkyl.

14. The alkoxylated polyalkylene imine or alkoxylated polyamine according to claim 1, wherein the variables within general formula (IIa) are defined as follows:

$R^1$ represents 1,2-ethylene, 1,2-propylene and/or 1,2-butylene; and/or $R^2$ represents hydrogen and/or $C_1$-$C_4$-alkyl; and/or $R^3$ represents linear or branched $C_2$-$C_{10}$-alkylene radicals; and/or $R^4$ represents 1,2-ethylene and/or 1,2-propylene; and/or $R^5$ represents 1,2-ethylene; and/or m is an integer having a value in the range of 1 to 5; and/or n is an integer having a value in the range of 10 to 50; and/or o is an integer having a value in the range of 10 to 50; and/or p is 1 or 2.

15. The alkoxylated polyalkylene imine or alkoxylated polyamine according to claim 1, wherein the variables within general formula (IIb) are defined as follows:

$R^1$ represents 1,2-ethylene, 1,2-propylene and/or 1,2-butylene; and/or $R^2$ represents hydrogen and/or $C_1$-$C_4$-alkyl; and/or $R^3$ represents linear or branched $C_2$-$C_{10}$-alkylene radicals; and/or $R^5$ represents 1,2-ethylene; and/or m is an integer having a value in the range of 1 to 5; and/or n is an integer having a value in the range of 10 to 50; and/or o is an integer having a value in the range of 10 to 50.

16. The alkoxylated polyalkylene imine or alkoxylated polyamine according to claim 1, wherein the variables within general formula (IIc) are defined as follows:

$R^1$ represents 1,2-ethylene, 1,2-propylene and/or 1,2-butylene; and/or $R^2$ represents hydrogen and/or $C_1$-$C_4$-alkyl; and/or $R^5$ represents 1,2-ethylene; and/or n is an integer having a value in the range of 10 to 50; and/or o is an integer having a value in the range of 10 to 50.

* * * * *